(12) United States Patent
Chen et al.

(10) Patent No.: US 9,971,124 B2
(45) Date of Patent: May 15, 2018

(54) IMAGING LENS

(71) Applicant: Genius Electronic Optical Co., Ltd., Taichung (TW)

(72) Inventors: Shih-Han Chen, Fujian (CN); Jia-Yuan Zhang, Fujian (CN); Chang-Lin Zhao, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 198 days.

(21) Appl. No.: 14/936,688

(22) Filed: Nov. 10, 2015

(65) Prior Publication Data
US 2017/0038557 A1 Feb. 9, 2017

(30) Foreign Application Priority Data

Aug. 4, 2015 (CN) .......................... 2015 1 0470470

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
CPC .............................. G02B 9/60; G02B 13/0045
USPC ........ 359/659, 682, 683, 714, 746, 763, 766
See application file for complete search history.

(56) References Cited

U.S. PATENT DOCUMENTS

| | | | |
|---|---|---|---|
| 7,911,711 B1 | 3/2011 | Tang et al. | |
| 8,379,325 B2 | 2/2013 | Tsai et al. | |
| 8,576,498 B2 | 11/2013 | Huang | |
| 8,780,456 B2 | 7/2014 | Shinano et al. | |
| 2014/0122807 A1 | 5/2014 | Chang et al. | |
| 2016/0139365 A1* | 5/2016 | Tang ........................ | G02B 9/60 348/360 |

FOREIGN PATENT DOCUMENTS

| | | |
|---|---|---|
| TW | 201237455 | 9/2012 |
| TW | 201314251 | 4/2013 |

OTHER PUBLICATIONS

"Office Action of Taiwan Counterpart Application," dated Jan. 16, 2017, p. 1-p. 7.

* cited by examiner

*Primary Examiner* — Darryl J Collins
*Assistant Examiner* — Journey Sumlar
(74) *Attorney, Agent, or Firm* — JCIPRNET

(57) ABSTRACT

An imaging lens including a first lens element, an aperture stop, a second lens element, a third lens element, a fourth lens element and a fifth lens element arranged in sequence from an object side to an image side along an optical axis is provided. Each of the first to the fifth lens elements has an object-side surface and an image-side surface. The first lens element has positive refractive power. The second lens element has refractive power. The third lens element has positive refractive power. The object-side surface of the third lens element has a concave portion in a vicinity of the optical axis. The fourth lens element has negative refractive power. The image-side surface of the fourth lens element has a convex portion in the vicinity of the optical axis. The fifth lens element has refractive power.

18 Claims, 28 Drawing Sheets

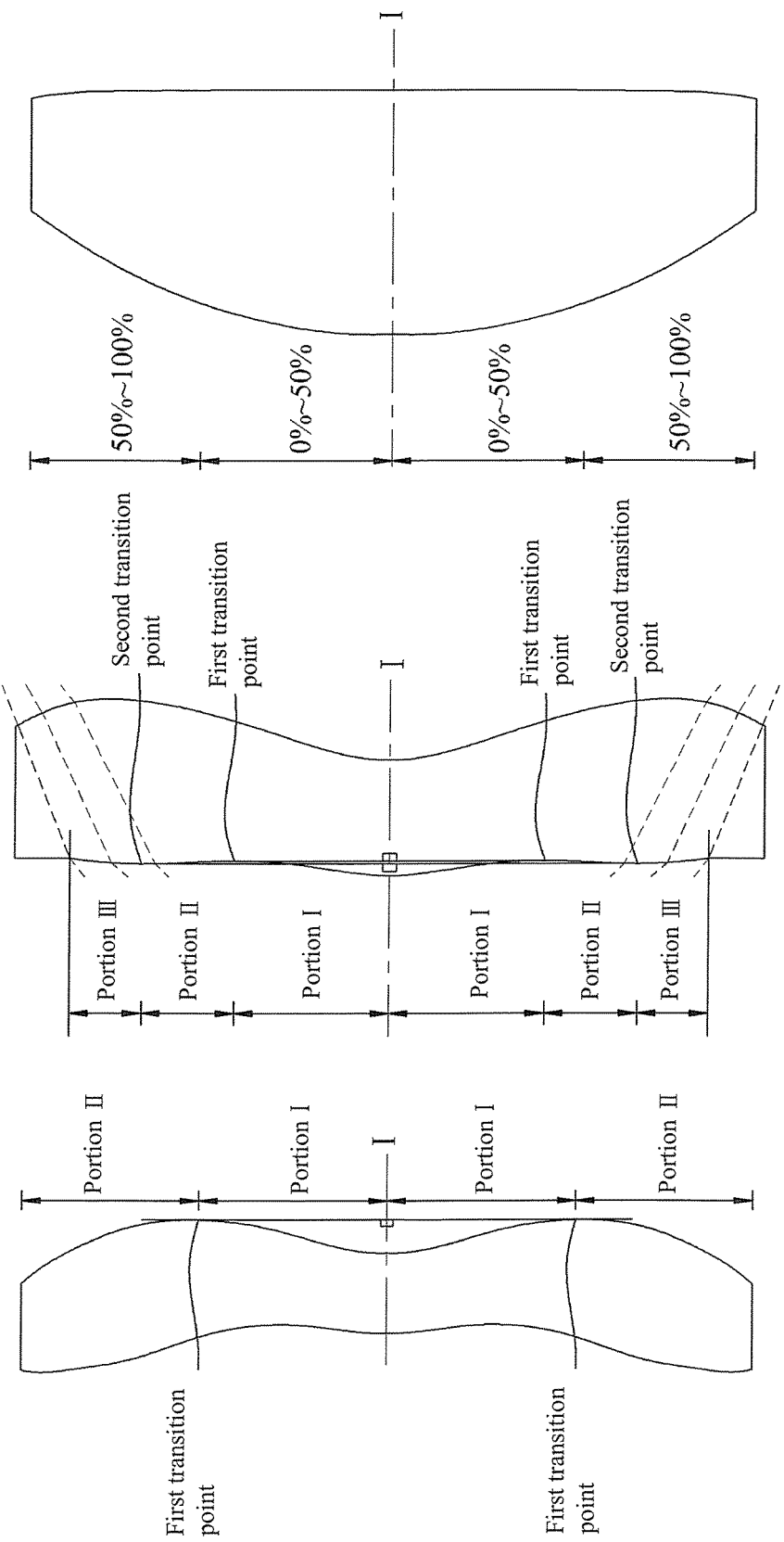

First embodiment

Effective focal length=2.343mm, Half field of view (HFOV)=44.190°, Fno=2.394, System length=4.111mm

| Lens element | Surface | Radius of curvature (mm) | Thickness (mm) | Refractive index | Dispersion coefficient | Focal length (mm) |
|---|---|---|---|---|---|---|
| Object | | | 400 | | | |
| First lens element 3 | Object-side surface 31 | 3.0490688 | 0.4051415 | 1.544102 | 56.114299 | 4.2926206 |
| | Image-side surface 32 | -9.652398 | 0.0653323 | | | |
| Aperture stop 2 | | 0 | 0.1452882 | | | |
| Second lens element 4 | Object-side surface 41 | -4.15922 | 0.3014706 | 1.64283 | 22.437318 | -11.06929 |
| | Image-side surface 42 | -10.18327 | 0.134797 | | | |
| Third lens element 5 | Object-side surface 51 | -6.774832 | 0.8591614 | 1.5350487 | 55.712362 | 1.4509308 |
| | Image-side surface 52 | -0.729493 | 0.1970763 | | | |
| Fourth lens element 6 | Object-side surface 61 | -1.344263 | 0.3 | 1.64283 | 22.437318 | -2.249014 |
| | Image-side surface 62 | -18.86955 | 0.1022245 | | | |
| Fifth lens element 7 | Object-side surface 71 | 1.5418889 | 0.3907737 | 1.5311296 | 55.744141 | 31.258798 |
| | Image-side surface 72 | 1.5494785 | 0.7014519 | | | |
| Light filter 9 | Object-side surface 91 | | 0.21 | 1.5168 | 64.167336 | 1E+10 |
| | Image-side surface 92 | | 0.2981502 | | | |
| | Image plane 100 | | 0 | | | |

FIG. 8

First embodiment

| Surface | K | a2 | a4 | a6 | a8 | a10 | a12 | a14 | a16 |
|---|---|---|---|---|---|---|---|---|---|
| 31 | 0 | 0 | 0.014007 | -0.09308 | 0.190317 | -0.04322 | -0.15718 | 0 | 0 |
| 32 | 0 | 0 | 0.054145 | 0.004528 | -0.201896 | 0 | 0 | 0 | 0 |
| 41 | 0 | 0 | -0.03142 | 0.013109 | -1.070013 | 0.893721 | -2.112150 | 0 | 0 |
| 42 | 0 | 0 | -0.11985 | -0.06206 | 0.104352 | -0.58112 | 0.197526 | 0 | 0 |
| 51 | 19.593607 | 0 | -0.32938 | 0.438113 | 0.048768 | -0.15688 | 0.035323 | 0 | 0 |
| 52 | -1.827829 | 0 | 0.040751 | -0.17083 | 0.109076 | 0.096397 | -0.016499 | 0 | 0 |
| 61 | -8.637369 | 0 | 0.197478 | -0.08882 | 0.024784 | -0.02032 | 0.005143 | 0 | 0 |
| 62 | -2.03145E+11 | 0 | 0.121855 | -0.04788 | -0.005561 | 0.005913 | -0.00106 | 0 | 0 |
| 71 | -0.575541 | 0 | -0.09581 | -0.00032 | -0.011794 | 0.000774 | 0.000734 | 0 | 0 |
| 72 | -0.348023 | 0 | -0.0537 | -0.05208 | 0.01611 | -0.00027 | -0.001048 | -2.8E-05 | 3.93E-05 |

FIG. 9

Second embodiment

Effective focal length=2.260mm, Half field of view (HFOV)=45.489°, Fno=2.483, System length=3.685mm

| Lens element | Surface | Radius of curvature (mm) | Thickness (mm) | Refractive index | Dispersion coefficient | Focal length (mm) |
|---|---|---|---|---|---|---|
| Object | | | 400 | | | |
| First lens element 3 | Object-side surface 31 | 3.1779999 | 0.3008738 | 1.544102 | 56.114299 | 4.0032854 |
| | Image-side surface 32 | -6.764615 | -0.027799 | | | |
| Aperture stop 2 | | 0 | 0.2079558 | | | |
| Second lens element 4 | Object-side surface 41 | 5.7659447 | 0.257625 | 1.64283 | 22.437318 | -11.3528 |
| | Image-side surface 42 | 3.1754792 | 0.1481086 | | | |
| Third lens element 5 | Object-side surface 51 | -3.651923 | 0.6887545 | 1.5350487 | 55.712362 | 1.4031567 |
| | Image-side surface 52 | -0.665559 | 0.0593654 | | | |
| Fourth lens element 6 | Object-side surface 61 | -1.093698 | 0.2612453 | 1.64283 | 22.437318 | -3.76599 |
| | Image-side surface 62 | -2.168303 | 0.1643408 | | | |
| Fifth lens element 7 | Object-side surface 71 | 1.3328398 | 0.4236758 | 1.5311296 | 55.744141 | -5.764593 |
| | Image-side surface 72 | 0.8268057 | 0.75 | | | |
| Light filter 9 | Object-side surface 91 | | 0.21 | 1.5168 | 64.167336 | 1E+10 |
| | Image-side surface 92 | | 0.2404299 | | | |
| | Image plane 100 | | 0 | | | |

FIG. 12

| Second embodiment | | | | | | | | | |
|---|---|---|---|---|---|---|---|---|---|
| Surface | K | a2 | a4 | a6 | a8 | a10 | a12 | a14 | a16 |
| 31 | 0 | 0 | -0.06621 | -0.21439 | -0.128110 | -0.14089 | -0.564122 | 0 | 0 |
| 32 | 0 | 0 | -0.13054 | -0.3306 | -0.071244 | 0 | 0 | 0 | 0 |
| 41 | 0 | 0 | -0.25031 | -0.20318 | -0.576812 | 0.903641 | -1.223871 | 0 | 0 |
| 42 | 0 | 0 | -0.09335 | -0.23578 | 0.019758 | 0.002855 | -0.001256 | 0 | 0 |
| 51 | 10.838067 | 0 | -0.01351 | 0.204238 | 0.030925 | -0.07878 | 0.075887 | 0 | 0 |
| 52 | -2.411433 | 0 | 0.037888 | -0.14425 | 0.075246 | 0.051252 | 0.060223 | 0 | 0 |
| 61 | -11.657757 | 0 | 0.309383 | -0.22727 | 0.051604 | 0.011218 | -0.021613 | 0 | 0 |
| 62 | -119.443721 | 0 | 0.124247 | -0.04201 | -0.011528 | -0.00245 | 0.003975 | 0 | 0 |
| 71 | -2.475234 | 0 | -0.15826 | 0.013687 | 0.003172 | 0.000261 | -7.05087E-06 | 0 | 0 |
| 72 | -3.589044 | 0 | -0.10428 | 0.033432 | -0.011114 | 0.000509 | 0.000711 | -0.00015 | 1.07E-06 |

FIG. 13

Third embodiment

Effective focal length=2.118mm, Half field of view (HFOV)=45.739°, Fno=2.449, System length=4.364mm

| Lens element | Surface | Radius of curvature (mm) | Thickness (mm) | Refractive index | Dispersion coefficient | Focal length (mm) |
|---|---|---|---|---|---|---|
| Object | | | 400 | | | |
| First lens element 3 | Object-side surface 31 | -1.86111 | 0.2536664 | 1.544102 | 56.114299 | 8.8354826 |
| | Image-side surface 32 | -1.407598 | 0.0952117 | | | |
| Aperture stop 2 | | 0 | 0.015838 | | | |
| Second lens element 4 | Object-side surface 41 | 2.554948 | 0.3258414 | 1.64283 | 22.437318 | 13.804186 |
| | Image-side surface 42 | 3.3973124 | 0.2808733 | | | |
| Third lens element 5 | Object-side surface 51 | -2608.336 | 1.6638457 | 1.5350487 | 55.712362 | 1.3372029 |
| | Image-side surface 52 | -0.717777 | 0.0695066 | | | |
| Fourth lens element 6 | Object-side surface 61 | -2.201935 | 0.2139744 | 1.64283 | 22.437318 | -4.091406 |
| | Image-side surface 62 | -13.49788 | 0.0762008 | | | |
| Fifth lens element 7 | Object-side surface 71 | 1.3137232 | 0.2802583 | 1.5311296 | 55.744141 | -3.472536 |
| | Image-side surface 72 | 0.7112979 | 0.5810712 | | | |
| Light filter 9 | Object-side surface 91 | | 0.21 | 1.5168 | 64.167336 | 1E+10 |
| | Image-side surface 92 | | 0.2972794 | | | |
| | Image plane 100 | | 0 | | | |

FIG. 16

Third embodiment

| Surface | K | a2 | a4 | a6 | a8 | a10 | a12 | a14 | a16 |
|---|---|---|---|---|---|---|---|---|---|
| 31 | 0 | 0 | 0.044464 | 0.075501 | 0.04163 | -0.1933 | 0.069827 | 0 | 0 |
| 32 | 0 | 0 | 0.234904 | -0.02607 | -0.097092 | 0 | 0 | 0 | 0 |
| 41 | 0 | 0 | -0.08321 | 1.185071 | -4.082562 | 5.061695 | -1.125670 | 0 | 0 |
| 42 | 0 | 0 | -0.22526 | 0.188666 | 1.945022 | -5.84242 | 5.096313 | 0 | 0 |
| 51 | -7.89757E+39 | 0 | -0.30087 | 0.603904 | -0.775145 | 0.833693 | -0.341591 | 0 | 0 |
| 52 | -3.400486 | 0 | -0.41025 | 0.361374 | -0.111659 | -0.06992 | 0.048628 | 0 | 0 |
| 61 | -0.409438 | 0 | -0.02828 | 0.133398 | -0.076465 | -0.02966 | 0.019498 | 0 | 0 |
| 62 | -4.73E+37 | 0 | 0.121372 | -0.08607 | 0.011316 | -6.3E-05 | 0.000543 | 0 | 0 |
| 71 | -4.821183 | 0 | -0.19259 | 0.016596 | 0.010524 | 0.001343 | -0.000706 | 0 | 0 |
| 72 | -4.706659 | 0 | -0.13839 | -0.00064 | 0.01132 | 0.000307 | -0.000441 | -7.7E-05 | 2.06E-05 |

FIG. 17

Fourth embodiment

Effective focal length=2.279mm, Half field of view (HFOV)=43.771°, Fno=2.498, System length=4.638mm

| Lens element | Surface | Radius of curvature (mm) | Thickness (mm) | Refractive index | Dispersion coefficient | Focal length (mm) |
|---|---|---|---|---|---|---|
| Object | | | 400 | | | |
| First lens element 3 | Object-side surface 31 | 6.4428712 | 0.5137211 | 1.544102 | 56.114299 | 6.6512362 |
| | Image-side surface 32 | -8.086421 | 0.0505073 | | | |
| Aperture stop 2 | | 0 | 0.0513286 | | | |
| Second lens element 4 | Object-side surface 41 | -48.99789 | 0.4250787 | 1.64283 | 22.437318 | -31.81413 |
| | Image-side surface 42 | 35.703504 | 0.0930364 | | | |
| Third lens element 5 | Object-side surface 51 | -7.219052 | 1.0799686 | 1.5350487 | 55.712362 | 1.6267844 |
| | Image-side surface 52 | -0.819728 | 0.2336038 | | | |
| Fourth lens element 6 | Object-side surface 61 | -1.723378 | 0.3739527 | 1.64283 | 22.437318 | -3.074841 |
| | Image-side surface 62 | -13.85896 | 0.0740551 | | | |
| Fifth lens element 7 | Object-side surface 71 | 1.702489 | 0.622447 | 1.531296 | 55.744141 | 298.88564 |
| | Image-side surface 72 | 1.5021673 | 0.6139483 | | | |
| Light filter 9 | Object-side surface 91 | | 0.21 | 1.5168 | 64.167336 | 1E+10 |
| | Image-side surface 92 | | 0.2966195 | | | |
| Image plane 100 | | | 0 | | | |

FIG. 20

Fourth embodiment

| Surface | K | a2 | a4 | a6 | a8 | a10 | a12 | a14 | a16 |
|---|---|---|---|---|---|---|---|---|---|
| 31 | 0 | 0 | 0.051446 | -0.03926 | 0.145061 | -0.05172 | -0.107077 | 0 | 0 |
| 32 | 0 | 0 | 0.174844 | 0.186026 | -0.946922 | 0 | 0 | 0 | 0 |
| 41 | 0 | 0 | 0.025717 | 0.071896 | -1.564111 | 0.936266 | -2.55617 | 0 | 0 |
| 42 | 0 | 0 | -0.16948 | -0.01624 | 0.714342 | -2.04681 | 1.029502 | 0 | 0 |
| 51 | 56.891902 | 0 | -0.257 | 0.64135 | -0.105849 | -0.86727 | 0.669399 | 0 | 0 |
| 52 | -2.415718 | 0 | -0.05039 | -0.14327 | 0.240969 | -0.15123 | 0.055333 | 0 | 0 |
| 61 | -8.858672 | 0 | 0.209684 | -0.09408 | -0.076733 | 0.087469 | -0.030616 | 0 | 0 |
| 62 | -8.51383E+19 | 0 | 0.169551 | -0.127 | 0.04908 | -0.01202 | 0.001339 | 0 | 0 |
| 71 | -5.598192 | 0 | -0.05636 | -0.01531 | 0.000642 | 0.004221 | -0.000739 | 0 | 0 |
| 72 | -2.992722 | 0 | -0.05469 | -0.01664 | 0.012177 | -0.00263 | 0.000167 | -5.7E-05 | 1.57E-05 |

FIG. 21

Fifth embodiment

Effective focal length=1.991mm, Half field of view (HFOV)=46.207°, Fno=2.411, System length=5.159mm

| Lens element | Surface | Radius of curvature (mm) | Thickness (mm) | Refractive index | Dispersion coefficient | Focal length (mm) |
|---|---|---|---|---|---|---|
| Object | | | 400 | | | |
| First lens element 3 | Object-side surface 31 | -1.824799 | 0.3217788 | 1.544102 | 56.114299 | -6.964879 |
| | Image-side surface 32 | -3.72708 | 0.2881627 | | | |
| Aperture stop 2 | | 0 | -0.066125 | | | |
| Second lens element 4 | Object-side surface 41 | 1.6549798 | 0.8962599 | 1.64283 | 22.437318 | 3.524523 |
| | Image-side surface 42 | 4.7319014 | 0.2324988 | | | |
| Third lens element 5 | Object-side surface 51 | -9.970015 | 1.2082172 | 1.5350487 | 55.712362 | 1.5950496 |
| | Image-side surface 52 | -0.82188 | 0.09405 | | | |
| Fourth lens element 6 | Object-side surface 61 | -1.681306 | 0.2999078 | 1.64283 | 22.437318 | -2.99062 |
| | Image-side surface 62 | -13.59841 | 0.0962011 | | | |
| Fifth lens element 7 | Object-side surface 71 | 1.7208531 | 0.8591618 | 1.5311296 | 55.744141 | 10.255986 |
| | Image-side surface 72 | 2.0758283 | 0.4319139 | | | |
| Light filter 9 | Object-side surface 91 | | 0.21 | 1.5168 | 64.167336 | 1E+10 |
| | Image-side surface 92 | | 0.2870398 | | | |
| | Image plane 100 | | 0 | | | |

FIG. 24

Fifth embodiment

| Surface | K | a2 | a4 | a6 | a8 | a10 | a12 | a14 | a16 |
|---|---|---|---|---|---|---|---|---|---|
| 31 | 0 | 0 | 0.206096 | -0.17842 | 0.106453 | -0.04884 | -0.01371 | 0 | 0 |
| 32 | 0 | 0 | 0.11701 | -0.18335 | 0.002858 | 0 | 0 | 0 | 0 |
| 41 | 0 | 0 | -0.15245 | 0.41001 | -1.788882 | 3.44992 | -3.126462 | 0 | 0 |
| 42 | 0 | 0 | -0.00203 | -0.16993 | 0.362931 | -0.4389 | 0.149237 | 0 | 0 |
| 51 | 0 | 0 | -0.19502 | 0.080428 | 0.012690 | -0.11415 | 0.062515 | 0 | 0 |
| 52 | -0.842585 | 0 | 0.137077 | -0.09927 | 0.002646 | -0.00771 | 0.018533 | 0 | 0 |
| 61 | -0.95081 | 0 | 0.246829 | -0.13916 | 0.040135 | 0.010615 | -0.008763 | 0 | 0 |
| 62 | -3.04178E+32 | 0 | 0.148234 | -0.14098 | 0.09403 | -0.03388 | 0.004577 | 0 | 0 |
| 71 | -0.103655 | 0 | -0.13938 | 0.002433 | 0.003910 | 0.000224 | -0.000413 | 0 | 0 |
| 72 | -21.225746 | 0 | -0.05911 | 0.008786 | 0.001808 | -0.00047 | -0.000102 | 3.2E-05 | -1.7E-06 |

FIG. 25

Sixth embodiment

Effective focal length=2.165mm, Half field of view (HFOV)=46.950°, Fno=2.261, System length=3.527mm

| Lens element | Surface | Radius of curvature (mm) | Thickness (mm) | Refractive index | Dispersion coefficient | Focal length (mm) |
|---|---|---|---|---|---|---|
| Object | | | 400 | | | |
| First lens element 3 | Object-side surface 31 | 6.2998498 | 0.2671068 | 1.544102 | 56.114299 | 4.3656246 |
| | Image-side surface 32 | -3.776376 | 0.0119663 | | | |
| Aperture stop 2 | | 0 | 0.0664383 | | | |
| Second lens element 4 | Object-side surface 41 | 7.5990286 | 0.2629833 | 1.64283 | 22.437318 | -12.20181 |
| | Image-side surface 42 | 3.8219671 | 0.1124976 | | | |
| Third lens element 5 | Object-side surface 51 | -3.947925 | 0.6980752 | 1.5350487 | 55.712362 | 1.7240056 |
| | Image-side surface 52 | -0.796007 | 0.0598259 | | | |
| Fourth lens element 6 | Object-side surface 61 | -1.544323 | 0.3 | 1.64283 | 22.437318 | -4.366685 |
| | Image-side surface 62 | -3.660101 | 0.0553539 | | | |
| Fifth lens element 7 | Object-side surface 71 | 0.7952029 | 0.3083118 | 1.5311296 | 55.744141 | -35.93841 |
| | Image-side surface 72 | 0.6605948 | 0.8741616 | | | |
| Light filter 9 | Object-side surface 91 | | 0.21 | 1.5168 | 64.167336 | 1E+10 |
| | Image-side surface 92 | | 0.3005309 | | | |
| | Image plane 100 | | 0 | | | |

FIG. 28

Sixth embodiment

| Surface | K | a2 | a4 | a6 | a8 | a10 | a12 | a14 | a16 |
|---|---|---|---|---|---|---|---|---|---|
| 31 | 0 | 0 | -0.05065 | -0.17942 | 0.261746 | 0.113606 | -0.278837 | 0 | 0 |
| 32 | 0 | 0 | 0.023797 | 0.03896 | -0.081175 | 0 | 0 | 0 | 0 |
| 41 | 0 | 0 | 0.02512 | -0.25712 | -0.925036 | -0.04196 | 0.531179 | 0 | 0 |
| 42 | 0 | 0 | -0.04563 | -0.2906 | -0.172248 | -0.27823 | 0.397308 | 0 | 0 |
| 51 | -10.941978 | 0 | -0.09086 | 0.303084 | 0.181541 | -0.02052 | -0.174392 | 0 | 0 |
| 52 | -1.794941 | 0 | 0.013504 | -0.10952 | 0.172691 | 0.141288 | 0.138796 | 0 | 0 |
| 61 | -12.32235 | 0 | 0.200025 | -0.12734 | 0.016749 | -0.01952 | -0.003997 | 0 | 0 |
| 62 | -224.620218 | 0 | 0.081777 | -0.05336 | 0.004343 | -0.00039 | 0.00018 | 0 | 0 |
| 71 | -2.515639 | 0 | -0.14342 | 0.009428 | 0.002503 | 0.00096 | -2.77824E-05 | 0 | 0 |
| 72 | -2.485738 | 0 | -0.11055 | 0.019998 | 0.001415 | -0.00073 | -0.000106 | 9.47E-06 | 8.17E-06 |

FIG. 29

Seventh embodiment

Effective focal length=2.244mm, Half field of view (HFOV)=45.754°, Fno=2.168, System length=3.915mm

| Lens element | Surface | Radius of curvature (mm) | Thickness (mm) | Refractive index | Dispersion coefficient | Focal length (mm) |
|---|---|---|---|---|---|---|
| Object | | | 400 | | | |
| First lens element 3 | Object-side surface 31 | 2.4654969 | 0.4257266 | 1.544102 | 56.114299 | 4.4640039 |
| | Image-side surface 32 | -198.5768 | 0.0420324 | | | |
| Aperture stop 2 | | 0 | 0.1006136 | | | |
| Second lens element 4 | Object-side surface 41 | 228.83226 | 0.3068578 | 1.64283 | 22.437318 | -13.73995 |
| | Image-side surface 42 | 8.5645056 | 0.1436926 | | | |
| Third lens element 5 | Object-side surface 51 | -7.714651 | 0.8560634 | 1.5345237 | 55.634523 | 1.4917408 |
| | Image-side surface 52 | -0.752904 | 0.0944087 | | | |
| Fourth lens element 6 | Object-side surface 61 | -1.342251 | 0.3 | 1.6504053 | 21.66665 | -2.926557 |
| | Image-side surface 62 | -4.861388 | 0.0965388 | | | |
| Fifth lens element 7 | Object-side surface 71 | 1.6643544 | 0.3888475 | 1.5311296 | 55.744141 | 43.525398 |
| | Image-side surface 72 | 1.6473989 | 0.6528987 | | | |
| Light filter 9 | Object-side surface 91 | | 0.21 | 1.5168 | 64.167336 | 1E+10 |
| | Image-side surface 92 | | 0.2972418 | | | |
| | Image plane 100 | | 0 | | | |

FIG. 32

Seventh embodiment

| Surface | K | a2 | a4 | a6 | a8 | a10 | a12 | a14 | a16 |
|---|---|---|---|---|---|---|---|---|---|
| 31 | 0 | 0 | 0.0189 | -0.08007 | 0.226716 | -0.0981 | -0.225588 | 0 | 0 |
| 32 | 0 | 0 | 0.063878 | -0.04685 | -0.354034 | 0 | 0 | 0 | 0 |
| 41 | 0 | 0 | 0.004582 | -0.23531 | -0.596447 | 0.834882 | -2.819669 | 0 | 0 |
| 42 | 0 | 0 | -0.06121 | -0.14101 | -0.184689 | -0.33096 | 0.330195 | 0 | 0 |
| 51 | 79.342245 | 0 | -0.20866 | 0.08023 | 0.054201 | 0.042127 | 0.272924 | 0 | 0 |
| 52 | -2.521735 | 0 | 0.001632 | -0.24874 | 0.0741 | 0.096609 | 0.05107 | 0 | 0 |
| 61 | -20.783918 | 0 | 0.143091 | -0.11591 | 0.047604 | -0.00292 | -0.004869 | 0 | 0 |
| 62 | -1068.659082 | 0 | 0.081852 | -0.03417 | 0.003843 | -0.0011 | 0.000159 | 0 | 0 |
| 71 | -0.596822 | 0 | -0.0884 | -0.01423 | -0.002914 | 0.001616 | 8.48545E-05 | 0 | 0 |
| 72 | -0.515066 | 0 | -0.0446 | -0.04585 | 0.012362 | 0.000481 | -0.000565 | -9.1E-05 | 3.37E-05 |

FIG. 33

| Eighth embodiment | | | | | |
|---|---|---|---|---|---|
| Effective focal length=2.376mm, Half field of view (HFOV)=43.618°, Fno=2.398, System length=3.903mm | | | | | |
| Lens element | Surface | Radius of curvature (mm) | Thickness (mm) | Refractive index | Dispersion coefficient | Focal length (mm) |
| Object | | | 400 | | | |
| First lens element 3 | Object-side surface 31 | 2.3954382 | 0.4231096 | 1.544102 | 56.114299 | 4.4241361 |
| | Image-side surface 32 | 272.87985 | 0.0555927 | | | |
| Aperture stop 2 | | 0 | 0.0431807 | | | |
| Second lens element 4 | Object-side surface 41 | 5.7038449 | 0.3051042 | 1.64283 | 22.437318 | -17.44636 |
| | Image-side surface 42 | 3.7112266 | 0.1576655 | | | |
| Third lens element 5 | Object-side surface 51 | -7.134586 | 0.8395072 | 1.5308025 | 49.619751 | 1.5315352 |
| | Image-side surface 52 | -0.762797 | 0.121036 | | | |
| Fourth lens element 6 | Object-side surface 61 | -1.484733 | 0.3 | 1.5824943 | 30.185652 | -2.728453 |
| | Image-side surface 62 | -22.35845 | 0.0875387 | | | |
| Fifth lens element 7 | Object-side surface 71 | 1.7112004 | 0.4205453 | 1.5311296 | 55.744141 | -32.65428 |
| | Image-side surface 72 | 1.4248805 | 0.6408238 | | | |
| Light filter 9 | Object-side surface 91 | | 0.21 | 1.5168 | 64.167336 | 1E+10 |
| | Image-side surface 92 | | 0.2988332 | | | |
| | Image plane 100 | | 0 | | | |

FIG. 36

Eighth embodiment

| Surface | K | a2 | a4 | a6 | a8 | a10 | a12 | a14 | a16 |
|---|---|---|---|---|---|---|---|---|---|
| 31 | 0 | 0 | 0.011258 | -0.10519 | 0.21335 | -0.06596 | -0.164732 | 0 | 0 |
| 32 | 0 | 0 | 0.069645 | -0.01998 | -0.320611 | 0 | 0 | 0 | 0 |
| 41 | 0 | 0 | 0.037693 | -0.03794 | -0.930156 | -0.50145 | 1.364647 | 0 | 0 |
| 42 | 0 | 0 | 0.002889 | -0.21597 | -0.04809 | -0.24365 | -0.047195 | 0 | 0 |
| 51 | 19.568154 | 0 | -0.15022 | 0.195454 | 0.039575 | -0.0572 | 0.007869 | 0 | 0 |
| 52 | -2.084534 | 0 | -0.00534 | -0.17983 | 0.134844 | 0.094023 | 0.038884 | 0 | 0 |
| 61 | -4.274591 | 0 | 0.193215 | -0.11584 | 0.035599 | -0.00828 | -0.004036 | 0 | 0 |
| 62 | -1.07958E+17 | 0 | 0.082068 | -0.0362 | 0.002452 | -0.00125 | 0.000467 | 0 | 0 |
| 71 | -0.886947 | 0 | -0.10571 | -0.00728 | -0.002678 | 0.000763 | 0.000435 | 0 | 0 |
| 72 | -1.239109 | 0 | -0.1051 | 0.00115 | 0.004571 | -0.00063 | -0.000379 | -2.9E-05 | 2.63E-05 |

FIG. 37

| Optical parameter | First embodiment | Second embodiment | Third embodiment | Fourth embodiment | Fifth embodiment | Sixth embodiment | Seventh embodiment | Eighth embodiment |
|---|---|---|---|---|---|---|---|---|
| T1 | 0.41 | 0.30 | 0.25 | 0.51 | 0.32 | 0.27 | 0.43 | 0.42 |
| G12 | 0.21 | 0.18 | 0.11 | 0.10 | 0.22 | 0.08 | 0.14 | 0.10 |
| T2 | 0.30 | 0.26 | 0.33 | 0.43 | 0.90 | 0.26 | 0.31 | 0.31 |
| G23 | 0.13 | 0.15 | 0.28 | 0.09 | 0.23 | 0.11 | 0.14 | 0.16 |
| T3 | 0.86 | 0.69 | 1.66 | 1.08 | 1.21 | 0.70 | 0.86 | 0.84 |
| G34 | 0.20 | 0.06 | 0.07 | 0.23 | 0.09 | 0.06 | 0.09 | 0.12 |
| T4 | 0.30 | 0.26 | 0.21 | 0.37 | 0.30 | 0.30 | 0.30 | 0.30 |
| G45 | 0.10 | 0.16 | 0.08 | 0.07 | 0.10 | 0.06 | 0.10 | 0.09 |
| T5 | 0.39 | 0.42 | 0.28 | 0.62 | 0.86 | 0.31 | 0.39 | 0.42 |
| G5F | 0.70 | 0.75 | 0.58 | 0.61 | 0.43 | 0.87 | 0.65 | 0.64 |
| TF | 0.21 | 0.21 | 0.21 | 0.21 | 0.21 | 0.21 | 0.21 | 0.21 |
| GFP | 0.30 | 0.24 | 0.30 | 0.30 | 0.29 | 0.30 | 0.30 | 0.30 |
| ALT | 2.26 | 1.93 | 2.74 | 3.02 | 3.59 | 1.84 | 2.28 | 2.29 |
| Gaa | 0.64 | 0.55 | 0.54 | 0.50 | 0.64 | 0.31 | 0.48 | 0.47 |

FIG. 38

| Optical parameter | First embodiment | Second embodiment | Third embodiment | Fourth embodiment | Fifth embodiment | Sixth embodiment | Seventh embodiment | Eighth embodiment |
|---|---|---|---|---|---|---|---|---|
| (T1+T2+T4+T5)/(T3+G12) | 1.31 | 1.43 | 0.60 | 1.64 | 1.66 | 1.47 | 1.42 | 1.54 |
| (T1+T2+T4+T5)/(T3+T5) | 1.12 | 1.12 | 0.55 | 1.14 | 1.15 | 1.13 | 1.14 | 1.15 |
| (G12+T3)/T2 | 3.55 | 3.37 | 5.45 | 2.78 | 1.60 | 2.95 | 3.25 | 3.08 |
| T3/T2 | 2.85 | 2.67 | 5.11 | 2.54 | 1.35 | 2.65 | 2.79 | 2.75 |
| ALT/T2 | 7.49 | 7.50 | 8.40 | 7.09 | 4.00 | 6.98 | 7.42 | 7.50 |
| Gaa/T5 | 1.65 | 1.30 | 1.92 | 0.81 | 0.75 | 0.99 | 1.23 | 1.11 |
| (T1+T2+T4+T5)/Gaa | 2.17 | 2.25 | 2.00 | 3.85 | 3.69 | 3.72 | 2.98 | 3.12 |
| (T1+T2+T4+T5)/(G12+G23+G45) | 3.12 | 2.52 | 2.29 | 7.20 | 4.32 | 4.62 | 3.71 | 4.21 |
| Gaa/T4 | 2.15 | 2.11 | 2.51 | 1.34 | 2.15 | 1.02 | 1.59 | 1.55 |
| ALT/Gaa | 3.50 | 3.50 | 5.09 | 6.00 | 5.56 | 6.00 | 4.77 | 4.92 |
| |V3−V4| | 33.28 | 33.28 | 33.28 | 33.28 | 33.28 | 33.28 | 33.97 | 19.43 |

FIG. 39

IMAGING LENS

CROSS-REFERENCE TO RELATED APPLICATION

This application claims the priority benefit of Chinese application serial no. 201510470470.9, filed on Aug. 4, 2015. The entirety of the above-mentioned patent application is hereby incorporated by reference herein and made a part of this specification.

BACKGROUND OF THE INVENTION

Field of the Invention

The invention relates to an optical lens, and particularly relates to an imaging lens.

Description of Related Art

Specifications of portable electronic products are developed quickly, and camera lenses serving as key components thereof are also developed in diversified ways. Applications of the camera lenses not only include image capturing and video recording, but also include environment monitoring, driving data recording, etc., and along with progress of image sensing technology, consumers have higher demand on imaging quality, so that the design of the camera lens not only requires a good imaging quality and a smaller lens space, but also has to consider improvement of field of view and the size of an aperture due to a dynamic and light inadequate environment.

Regarding the design of the camera lens, in order to fabricate the camera lens with both characteristics of good imaging quality and miniaturization, it is not enough to purely scale down the lenses with good imaging quality, and a material property is also involved, and practical problems in production such as a fabrication process, an assembling yield, etc., are also considered.

Therefore, a technical difficulty of the miniaturized lenses is obviously higher than that of the conventional lenses, so that it is still a target of the industry to fabricate the camera lens conformed with the dynamic and light inadequate environment and continuously improve the imaging quality and reduce a length of the camera lens.

SUMMARY OF THE INVENTION

The invention provides an imaging lens with a good optical performance under conditions of a thinning tendency and an enlarged field of view.

An embodiment of the invention provides an imaging lens including a first lens element, an aperture stop, a second lens element, a third lens element, a fourth lens element and a fifth lens element arranged in sequence from an object side to an image side along an optical axis, and each of the first lens element, the second lens element, the third lens element, the fourth lens element and the fifth lens element includes an object-side surface facing toward the object side and pervious to an imaging light and an image-side surface facing toward the image side and pervious to the imaging light.

The first lens element has positive refractive power, the second lens element has refractive power, the third lens element has positive refractive power, and the object-side surface of the third lens element has a concave portion in a vicinity of the optical axis. The fourth lens element has negative refractive power, and the image-side surface of the fourth lens element has a convex portion in the vicinity of the optical axis. The fifth lens element has refractive power.

The amount of the lens elements having refractive power in the imaging lens is 5, a thickness of the first lens element on the optical axis is $T1$, a thickness of the second lens element on the optical axis is $T2$, a thickness of the third lens element on the optical axis is $T3$, a thickness of the fourth lens element on the optical axis is $T4$, and a thickness of the fifth lens element on the optical axis is $T5$, and an air gap between the second lens element and the third lens element on the optical axis is $G23$, and the imaging lens satisfies $(T1+T2+T4+T5)/(T3+G23) \leq 1.65$.

Advantageous effects of the imaging lens according to the embodiment of the invention are as follows. Based on the design and arrangement of the concave and convex shapes of the object-side surface or the image-side surface of the lens elements, the imaging lens still has an optical performance capable of effectively overcoming aberration and is capable of providing good imaging quality under conditions of a thinning tendency and an improved field of view.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic diagram illustrating a surface structure of a lens element of a first example.

FIG. 4 is a schematic diagram illustrating a surface structure of a lens element of a second example.

FIG. 5 is a schematic diagram illustrating a surface structure of a lens element of a third example.

FIG. 8 is a table diagram of optical data of each lens element according to the first embodiment of the invention.

FIG. 9 is a table diagram of aspheric coefficients of each lens element according to the first embodiment of the invention.

FIG. 12 is a table diagram of optical data of each lens element according to the second embodiment of the invention.

FIG. 13 is a table diagram of aspheric coefficients of each lens element according to the second embodiment of the invention.

FIG. 16 is a table diagram of optical data of each lens element according to the third embodiment of the invention.

FIG. 17 is a table diagram of aspheric coefficients of each lens element according to the third embodiment of the invention.

FIG. 20 is a table diagram of optical data of each lens element according to the fourth embodiment of the invention.

FIG. 21 is a table diagram of aspheric coefficients of each lens element according to the fourth embodiment of the invention.

FIG. 24 is a table diagram of optical data of each lens element according to the fifth embodiment of the invention.

FIG. 25 is a table diagram of aspheric coefficients of each lens element according to the fifth embodiment of the invention.

FIG. 28 is a table diagram of optical data of each lens element according to the sixth embodiment of the invention.

FIG. 29 is a table diagram of aspheric coefficients of each lens element according to the sixth embodiment of the invention.

FIG. 32 is a table diagram of optical data of each lens element according to the seventh embodiment of the invention.

FIG. 33 is a table diagram of aspheric coefficients of each lens element according to the seventh embodiment of the invention.

FIG. 36 is a table diagram of optical data of each lens element according to the eighth embodiment of the invention.

FIG. 37 is a table diagram of aspheric coefficients of each lens element according to the eighth embodiment of the invention.

FIG. 38 is a table diagram of optical parameters of the imaging lens from the first embodiment to the eighth embodiment.

FIG. 39 is a table diagram of optical parameters of the imaging lens from the first embodiment to the eighth embodiment.

DESCRIPTION OF EMBODIMENTS

Before the invention is described in detail, it should be noted that in the following descriptions, the similar components are represented by the same referential number.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
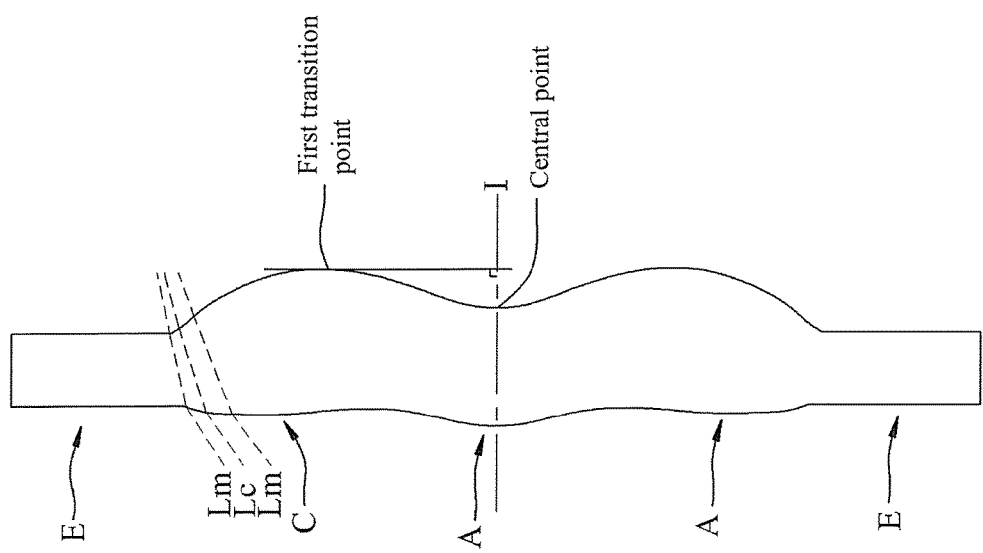
FIG. 1 is a schematic diagram illustrating a surface structure of a lens element.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
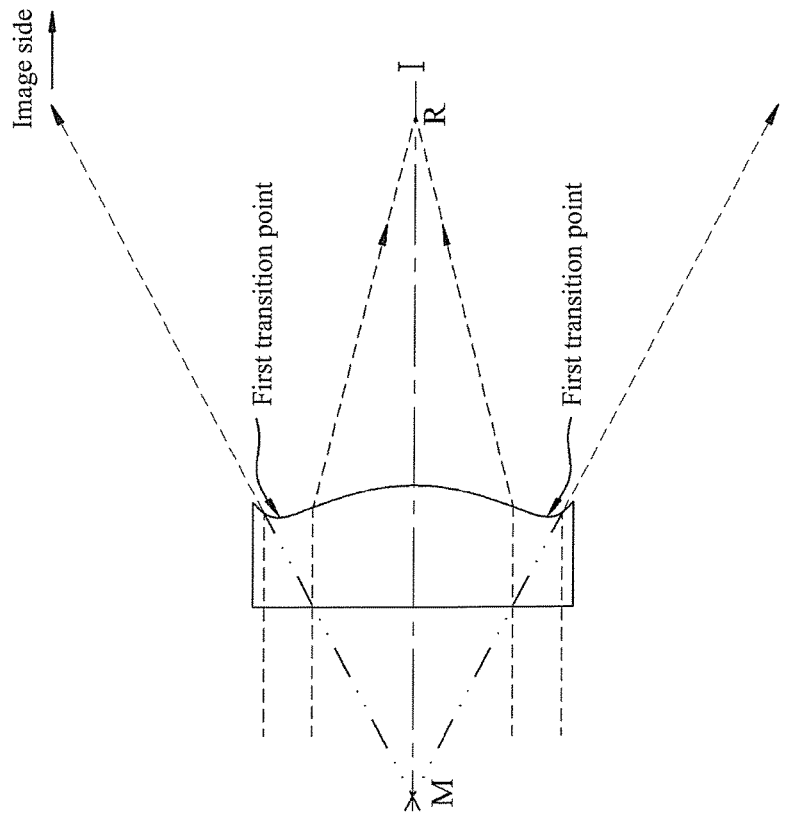
FIG. 2 is a schematic diagram illustrating a surface concave/convex structure and a light focus of a lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
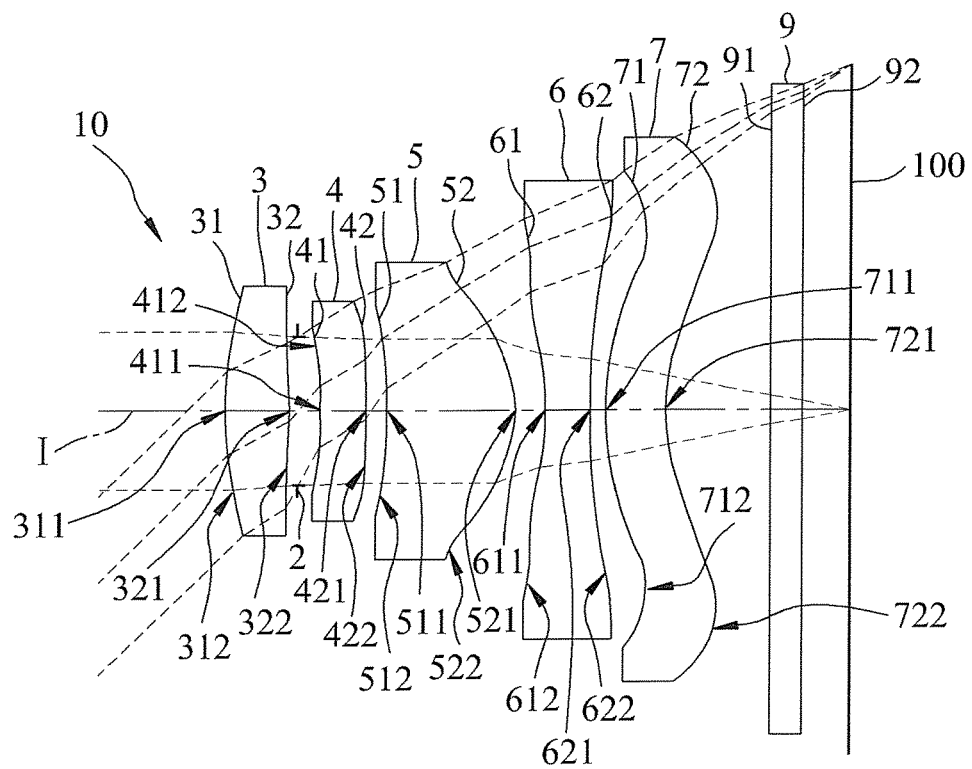
FIG. 6 is a schematic diagram of a configuration of an imaging lens according to a first embodiment of the invention.

Referring to FIG. 6 and FIG. 8, in a first embodiment of the invention, an imaging lens 10 includes a first lens element 3, an aperture stop 2, a second lens element 4, a third lens element 5, a fourth lens element 6, a fifth lens element 7 and a light filter 9 arranged in sequence from an object side to an image side along an optical axis I. When a light emitted by an object to be captured enters the imaging lens 10, after the light passes through the first lens element 3, the aperture stop 2, the second lens element 4, the third lens element 5, the fourth lens element 6 and the fifth lens element 7 and the light filter 9, an image is formed on an image plane 100. The light filter 9 is an infrared (IR) cut filter, which is used for preventing an IR ray in the light from being transmitted to the image plane 100 to influence imaging quality. It should be noted that the object side is a side facing the object to be captured, and the image side is a side facing the image plane 100.

The first lens element 3, the second lens element 4, the third lens element 5, the fourth lens element 6, the fifth lens element 7 and the light filter 9 respectively have object-side surfaces 31, 41, 51, 61, 71, 91 facing toward the object side and pervious to an imaging light and image-side surfaces 32, 42, 52, 62, 72, 92 facing toward the image side and pervious to the imaging light. The object-side surfaces 31, 41, 51, 61 and 71 and the image-side surfaces 32, 42, 52, 62 and 72 are all aspheric surfaces.

Moreover, in order to satisfy a product demand of lightweight, the first lens element 3 to the fifth lens element 7 all have refractive power and are all made of plastic materials, though the materials of the first lens element 3 to the fifth lens element 7 are not limited thereto.

The first lens element 3 has positive refractive power, the object-side surface 31 of the first lens element 3 is a convex surface, and has a convex portion 311 in the vicinity of the optical axis I and a convex portion 312 in the vicinity of a periphery; the image-side surface 32 of the first lens element 3 is a convex surface, and has a convex portion 321 in the vicinity of the optical axis I and a convex portion 322 in the vicinity of the periphery.

The second lens element 4 has negative refractive power, the object-side surface 41 of the second lens element 4 is a concave surface, and has a concave portion 411 in the vicinity of the optical axis I and a concave portion 412 in the vicinity of the periphery; the image-side surface 42 of the second lens element 4 is a convex surface, and has a convex portion 421 in the vicinity of the optical axis I and a convex portion 422 in the vicinity of the periphery.

The third lens element 5 has positive refractive power, the object-side surface 51 of the third lens element 5 is a concave surface, and has a concave portion 511 in the vicinity of the optical axis I and a concave portion 512 in the vicinity of the periphery; the image-side surface 52 of the third lens element 5 is a convex surface, and has a convex portion 521 in the vicinity of the optical axis I and a convex portion 522 in the vicinity of the periphery.

The fourth lens element 6 has negative refractive power, the object-side surface 61 of the fourth lens element 6 is a concave surface, and has a concave portion 611 in the vicinity of the optical axis I and a concave portion 612 in the vicinity of the periphery; the image-side surface 62 of the fourth lens element 6 is a convex surface, and has a convex portion 621 in the vicinity of the optical axis I and a convex portion 622 in the vicinity of the periphery.

The fifth lens element 7 has negative refractive power, the object-side surface 71 of the fifth lens element 7 has a convex portion 711 in the vicinity of the optical axis I and a concave portion 712 in the vicinity of the periphery; the image-side surface 72 of the fifth lens element 7 is a convex surface, and has a concave portion 721 in the vicinity of the optical axis I and a convex portion 722 in the vicinity of the periphery.

In the first embodiment, only the aforementioned lens elements have refractive power.

Other detailed optical data of the first embodiment is shown in FIG. 8, and an effective focal length (EFL) of the whole system of the first embodiment is 2.343 mm, a half field of view (HFOV) thereof is 44.190°, an f-number (Fno) thereof is 2.394, and a system length thereof is 4.111 mm. The system length refers to a distance between the object-side surface 31 of the first lens element 3 and the image plane 100 on the optical axis I.

Moreover, totally 10 surfaces of the object-side surfaces 31, 41, 51, 61 and 71 and the image-side surfaces 32, 42, 52, 62 and 72 of the first lens element 3, the second lens element 4, the third lens element 5, the fourth lens element 6 and the fifth lens element 7 are all aspheric surfaces, and the aspheric surfaces are defined by the following equations:

$$Z(Y) = \frac{Y^2}{R} / \left(1 + \sqrt{1 - (1+K)\frac{Y^2}{R^2}}\right) + \sum_{i=1}^{n} a_{2i} \times Y^{2i} \quad (1)$$

Where:
Y: a distance between a point on an aspheric curve and the optical axis I;
Z: a depth of the aspheric surface (a perpendicular distance between the point on the aspheric surface that is spaced by the distance Y from the optical axis I and a tangent plane tangent to a vertex of the aspheric surface on the optical axis I);
R: a radius of curvature of the surface of the lens element;
K: a conic constant;
$a_{2i}$: $2i^{th}$ aspheric coefficient.

Various aspheric coefficients of the object-side surface 31 of the first lens element 3 to the image-side surface 72 of the fifth lens element 7 in the equation (1) are shown in FIG. 9. In FIG. 9, a field referential number 31 represents the aspheric coefficients of the object-side surface 31 of the first lens element 3, and the other fields are deduced by analogy.

Moreover, relationships between various important parameters of the imaging lens 10 of the first embodiment are shown in FIG. 38 and FIG. 39.

Where,
T1 is a thickness of the first lens element 3 on the optical axis I;
T2 is a thickness of the second lens element 4 on the optical axis I;
T3 is a thickness of the third lens element 5 on the optical axis I;
T4 is a thickness of the fourth lens element 6 on the optical axis I;
T5 is a thickness of the fifth lens element 7 on the optical axis I;
G12 is an air gap between the first lens element 3 and the second lens element 4 on the optical axis I;
G23 is an air gap between the second lens element 4 and the third lens element 5 on the optical axis I;
G34 is an air gap between the third lens element 5 and the fourth lens element 6 on the optical axis I;
G45 is an air gap between the fourth lens element 6 and the fifth lens element 7 on the optical axis I;
Gaa is a sum of the four air gaps among the first lens element 3 to the fifth lens element 7 on the optical axis I, i.e. a sum of G12, G23, G34 and G45;
ALT is a sum of the thickness of the first lens element 3, the second lens element 4, the third lens element 5, the fourth lens element 6 and the fifth lens element 7 on the optical axis I, i.e. a sum of T1, T2, T3, T4 and T5;
TTL is a distance between the object-side surface 31 of the first lens element 3 and the image plane 100 on the optical axis I;
BFL is a distance between the image-side surface 72 of the fifth lens element 7 and the image plane 100 on the optical axis I; and
EFL is an effective focal length of the imaging lens 10.

Moreover, it is further defined that:
G5F is an air gap between the fifth lens element 7 and the light filter 9 on the optical axis I;
TF is a thickness of the light filter 9 on the optical axis I;
GFI is an air gap between the light filter 9 and the image plane 100 on the optical axis I;
f1 is a focal length of the first lens element 3;
f2 is a focal length of the second lens element 4;
f3 is a focal length of the third lens element 5;
f4 is a focal length of the fourth lens element 6;
f5 is a focal length of the fifth lens element 7;
n1 is a refractive index of the first lens element 3;
n2 is a refractive index of the second lens element 4;
n3 is a refractive index of the third lens element 5;
n4 is a refractive index of the fourth lens element 6;
n5 is a refractive index of the fifth lens element 7;
υ1 is an Abbe number of the first lens element 3, where the Abbe number can also be referred to as a dispersion coefficient;
υ2 is an Abbe number of the second lens element 4;
υ3 is an Abbe number of the third lens element 5;
υ4 is an Abbe number of the fourth lens element 6; and
υ5 is an Abbe number of the fifth lens element 7.

Figure 7:
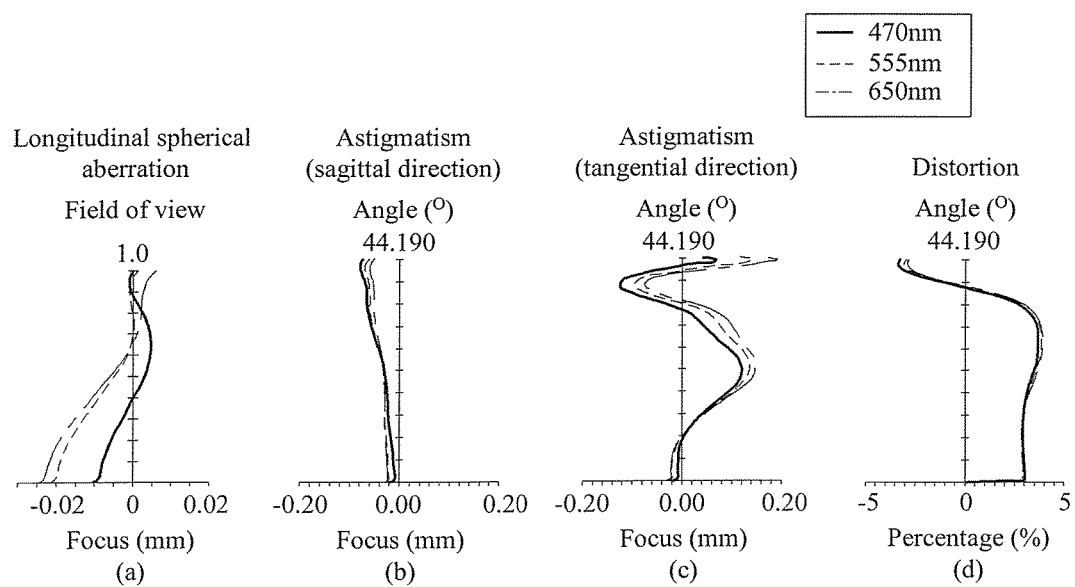
FIG. 7 is a diagram of a longitudinal spherical aberration and various aberrations of the first embodiment of the invention.

Referring to FIG. 7, a diagram (a) illustrates a longitudinal spherical aberration of the first embodiment, diagrams (b) and (c) respectively illustrate an astigmatism aberration of a sagittal direction on the image plane 100 and an astigmatism aberration of a tangential direction on the image plane 100, and a diagram (d) illustrates a distortion aberration on the image plane 100 of the first embodiment. In the diagram of the longitudinal spherical aberration of the first embodiment of FIG. 7(a), curves formed by each wavelength are close to each other and are gathered in the middle, which represents that off-axis lights of different heights of each wavelength are gathered around imaging points, and according to a deviation range of the curve of each wavelength, it is learned that a deviation of the imaging points of the off-axis lights of different heights is controlled within a range of ±0.025 mm, so that the spherical aberration of the same wavelength is obviously ameliorated. Moreover, the distances between the three representative wavelengths are rather close, which represents that imaging positions of the lights with different wavelengths are rather close, so that a chromatic aberration is obviously ameliorated.

In the diagram of the two astigmatism aberrations of FIG. 7(b) and FIG. 7(c), a focal length variation of the three representative wavelengths in the whole field of view falls within ±0.19 mm, which represents that the optical system of the first embodiment may effectively eliminate the aberration. The diagram of the distortion aberration of FIG. 7(d) shows that the distortion aberration of the first embodiment is maintained within a range of ±3.8%, which represents that the distortion aberration of the first embodiment is complied with an imaging quality requirement of the optical system. Compared to the existing optical lenses, the imaging lens of the first embodiment of the invention may still provide good imaging quality under a condition that that the system length is reduced to about 4.110 mm. Therefore, under the condition of maintaining a good optical performance, the lens length is reduced and a capturing angle is expanded to implement product designs of a thinning tendency and an enlarged field of view (FOV).

Figure 10:
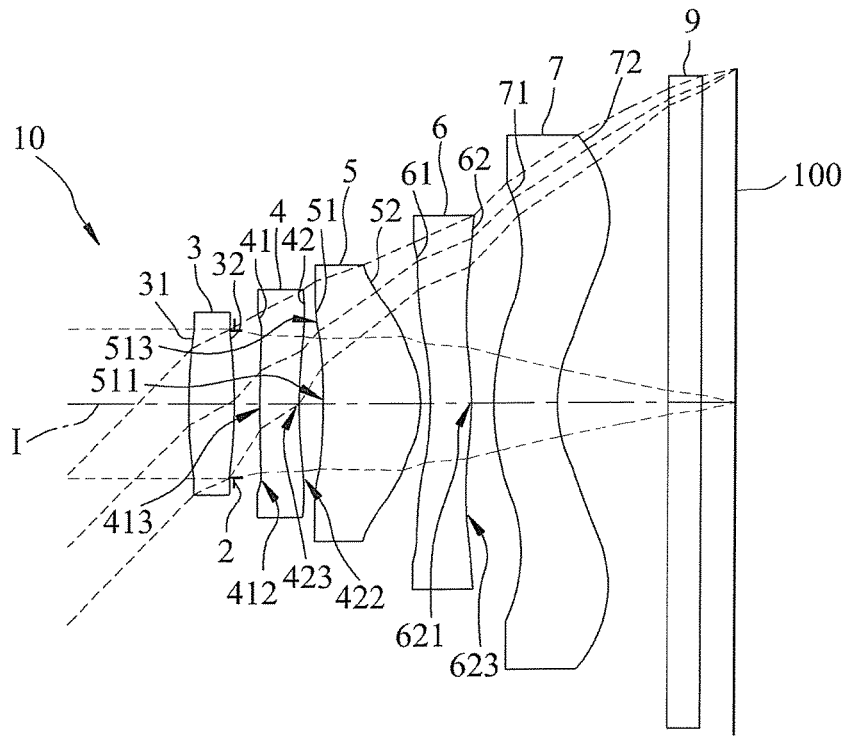
FIG. 10 is a schematic diagram of a configuration of an imaging lens according to a second embodiment of the invention.

Referring to FIG. 10, FIG. 10 illustrates the imaging lens 10 according to a second embodiment of the invention. The second embodiment is similar to the first embodiment, and only optical data, aspheric coefficients and parameters between the lens elements 3, 4, 5, 6 and 7 are somewhat different, and the object-side surface 41 of the second lens element 4 has a convex portion 413 in the vicinity of the optical axis I and a concave portion 412 in the vicinity of the periphery, and the image-side surface 42 of the second lens element 4 has a concave portion 423 in the vicinity of the optical axis I and a convex portion 422 in the vicinity of the periphery; the object-side surface 51 of the third lens element 5 has a concave portion 511 in the vicinity of the optical axis I and a convex portion 513 in the vicinity of the periphery; the image-side surface 62 of the fourth lens element 6 has a convex portion 621 in the vicinity of the optical axis I and a concave portion 623 in the vicinity of the periphery. It should be noted that in order to clearly display the figure, a part of the referential numbers of the concave portions and the convex portions that are the same as those of the first embodiment are omitted in FIG. 10.

Detailed optical data of the second embodiment is shown in FIG. 12, and an EFL of the whole system of the second embodiment is 2.260 mm, an HFOV thereof is 45.489°, an Fno thereof is 2.483, and a system length thereof is 3.685 mm.

FIG. 13 illustrates various aspheric coefficients of the object-side surface 31 of the first lens element 3 to the image-side surface 72 of the fifth lens element 7 in the equation (1) in the second embodiment.

Moreover, relationships between various important parameters of the imaging lens 10 of the second embodiment are shown in FIG. 38 and FIG. 39.

Figure 11:
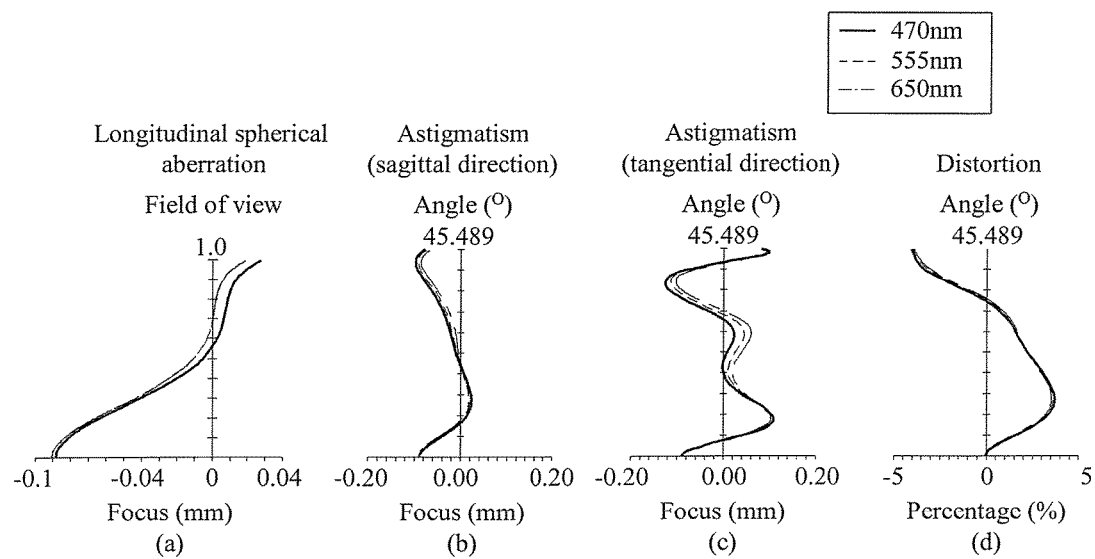
FIG. 11 is a diagram of a longitudinal spherical aberration and various aberrations of the second embodiment of the invention.

Referring to FIG. 11, according to the longitudinal spherical aberration of the diagram (a), the astigmatism aberrations of the diagrams (b) and (c), and the distortion aberration of the diagram (d), it is known that the second embodiment may also achieve the good optical performance.

According to the above description, it is learned that compared to the first embodiment, the advantages of the second embodiment are that the HFOV of the second embodiment is greater than the HFOV of the first embodiment, and the lens length of the second embodiment is smaller than the lens length of the first embodiment.

Figure 14:
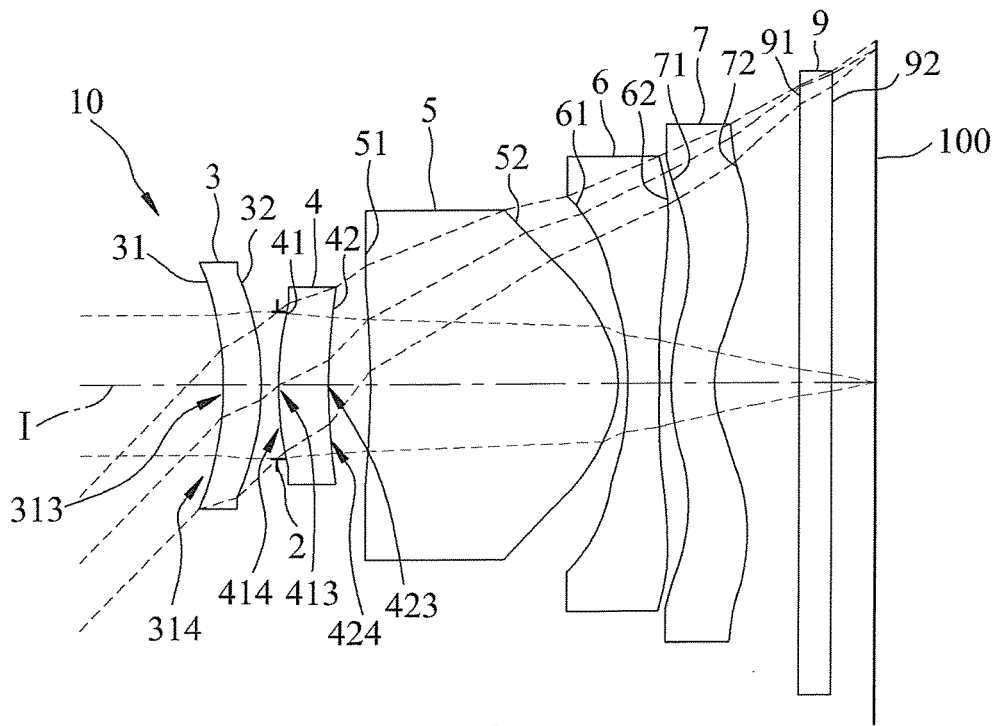
FIG. 14 is a schematic diagram of a configuration of an imaging lens according to a third embodiment of the invention.

Referring to FIG. 14, FIG. 14 illustrates the imaging lens 10 according to a third embodiment of the invention. The third embodiment is similar to the first embodiment, and only optical data, aspheric coefficients and parameters between the lens elements 3, 4, 5, 6 and 7 are somewhat different, and the object-side surface 31 of the second lens element 3 is a concave surface and has a convex portion 313 in the vicinity of the optical axis I and a concave portion 314 in the vicinity of the periphery; the object-side surface 41 of the second lens element 4 is a convex surface and has a convex portion 413 in the vicinity of the optical axis I and a convex portion 414 in the vicinity of the periphery, and the image-side surface 42 of the second lens element 4 is a concave surface and has a concave portion 423 in the vicinity of the optical axis I and a concave portion 424 in the vicinity of the periphery. It should be noted that in order to clearly display the figure, a part of the referential numbers of the concave portions and the convex portions that are the same as those of the first embodiment are omitted in FIG. 14.

Detailed optical data of the third embodiment is shown in FIG. 16, and an EFL of the whole system of the third embodiment is 2.118 mm, an HFOV thereof is 45.739°, an Fno thereof is 2.449, and a system length thereof is 4.364 mm.

FIG. 17 illustrates various aspheric coefficients of the object-side surface 31 of the first lens element 3 to the image-side surface 72 of the fifth lens element 7 in the equation (1) in the third embodiment.

Moreover, relationships between various important parameters of the imaging lens 10 of the third embodiment are shown in FIG. 38 and FIG. 39.

Figure 15:
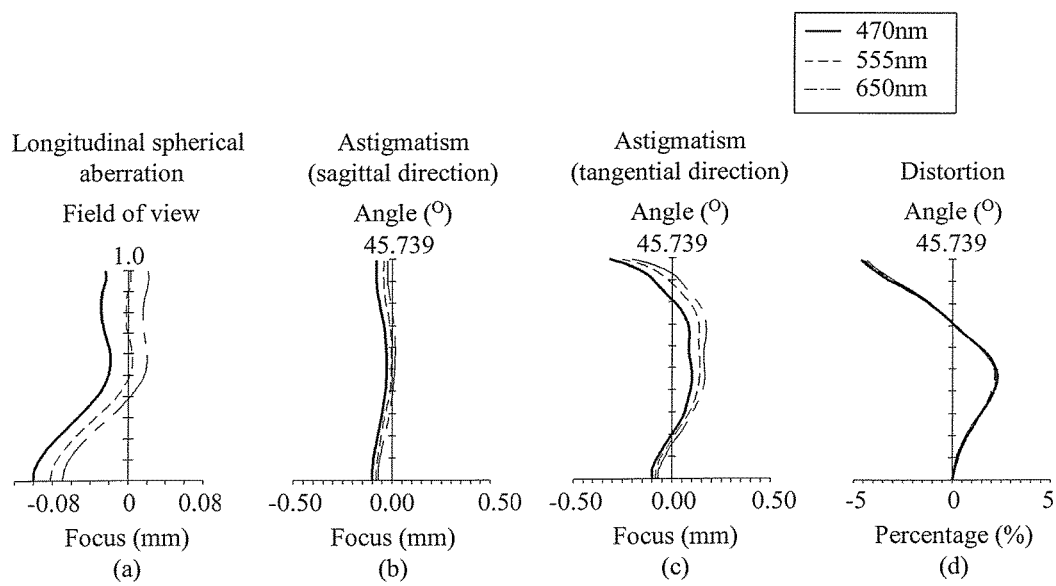
FIG. 15 is a diagram of a longitudinal spherical aberration and various aberrations of the third embodiment of the invention.

Referring to FIG. 15, according to the longitudinal spherical aberration of the diagram (a), the astigmatism aberrations of the diagrams (b) and (c), and the distortion aberration of the diagram (d), it is known that the third embodiment may also achieve the good optical performance.

According to the above description, it is learned that compared with the first embodiment, the advantages of the third embodiment are that the HFOV of the third embodiment is greater than the HFOV of the first embodiment, and the imaging quality of the third embodiment is superior to the imaging quality of the first embodiment.

Figure 18:
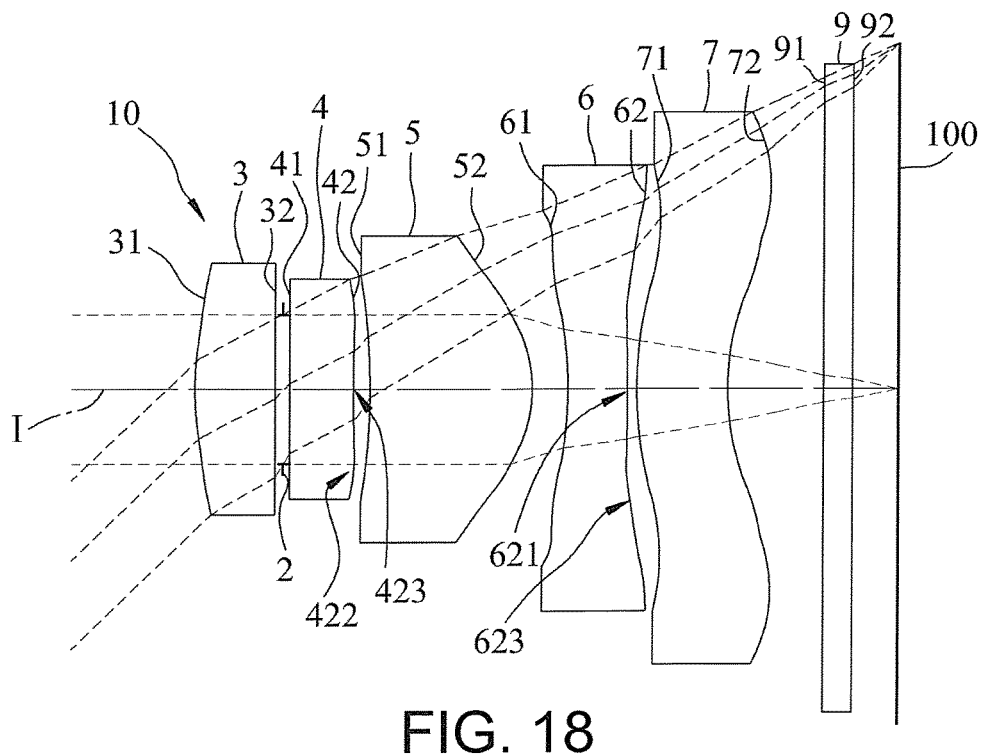
FIG. 18 is a schematic diagram of a configuration of an imaging lens according to a fourth embodiment of the invention.

Referring to FIG. 18, FIG. 18 illustrates the imaging lens 10 according to a fourth embodiment of the invention. The fourth embodiment is similar to the first embodiment, and only optical data, aspheric coefficients and parameters between the lens elements 3, 4, 5, 6 and 7 are somewhat different, and the image-side surface 42 of the second lens element 4 has a concave portion 423 in the vicinity of the optical axis I and a convex portion 422 in the vicinity of the periphery; and the image-side surface 62 of the fourth lens element 6 has a convex portion 621 in the vicinity of the optical axis I and a concave portion 623 in the vicinity of the periphery. It should be noted that in order to clearly display the figure, a part of the referential numbers of the concave portions and the convex portions that are the same as those of the first embodiment are omitted in FIG. 18.

Detailed optical data of the fourth embodiment is shown in FIG. 20, and an EFL of the whole system of the fourth embodiment is 2.279 mm, an HFOV thereof is 43.771°, an Fno thereof is 2.498, and a system length thereof is 4.638 mm.

FIG. 21 illustrates various aspheric coefficients of the object-side surface 31 of the first lens element 3 to the image-side surface 72 of the fifth lens element 7 in the equation (1) in the fourth embodiment.

Moreover, relationships between various important parameters of the imaging lens 10 of the fourth embodiment are shown in FIG. 38 and FIG. 39.

Figure 19:
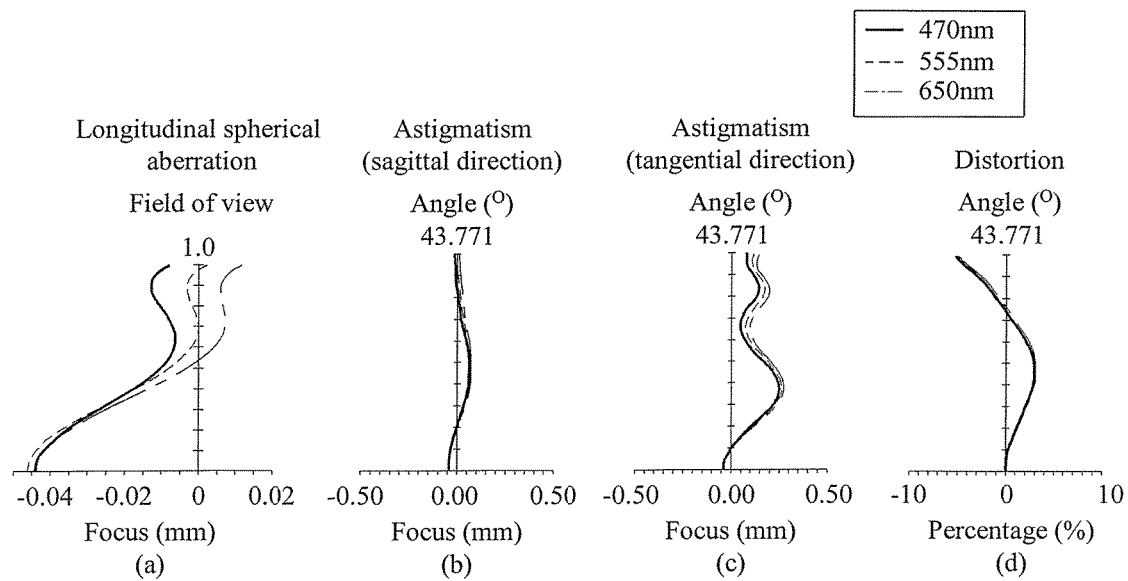
FIG. 19 is a diagram of a longitudinal spherical aberration and various aberrations of the fourth embodiment of the invention.

Referring to FIG. 19, according to the longitudinal spherical aberration of the diagram (a), the astigmatism aberrations of the diagrams (b) and (c), and the distortion aberration of the diagram (d), it is known that the fourth embodiment may also achieve the good optical performance.

According to the above description, it is learned that compared with the first embodiment, the advantage of the fourth embodiment is that the imaging lens of the fourth embodiment is easy to be manufactured compared with that of the first embodiment, so that a yield of the image lens of the fourth embodiment is higher.

Figure 22:
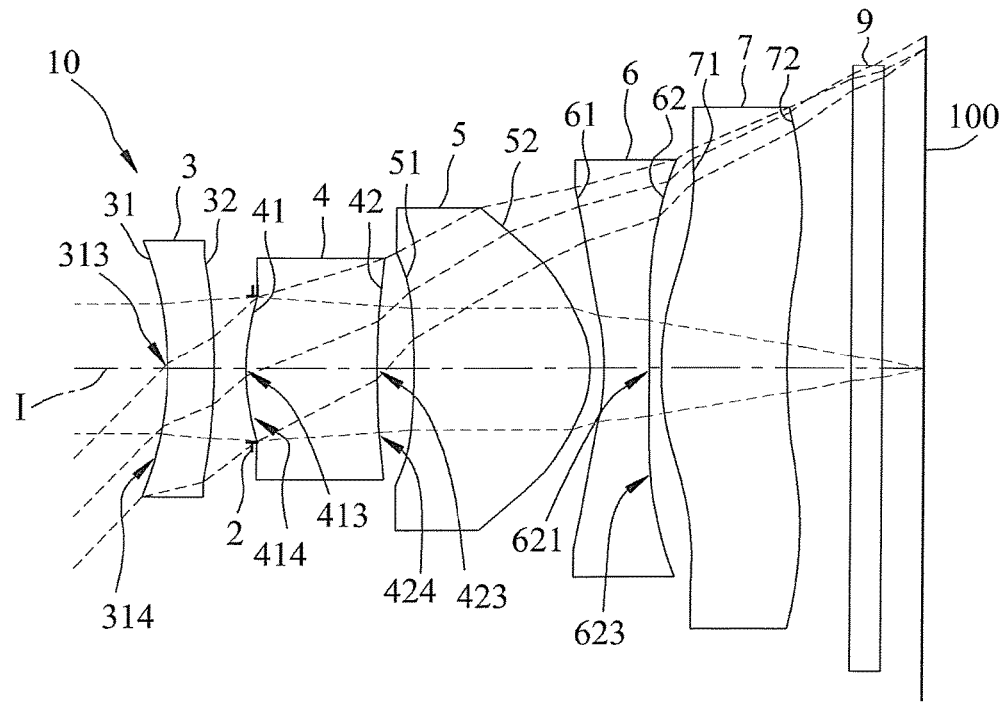
FIG. 22 is a schematic diagram of a configuration of an imaging lens according to a fifth embodiment of the invention.

Referring to FIG. 22, FIG. 22 illustrates the imaging lens 10 according to a fifth embodiment of the invention. The fifth embodiment is similar to the first embodiment, and only optical data, aspheric coefficients and parameters between the lens elements 3, 4, 5, 6 and 7 are somewhat different, and the object-side surface 31 of the first lens element 3 is a concave surface and has a concave portion 313 in the vicinity of the optical axis I and a concave portion 314 in the vicinity of the periphery; the object-side surface 41 of the second lens element 4 is a convex surface and has a convex portion 413 in the vicinity of the optical axis I and a convex portion 414 in the vicinity of the periphery, and the image-side surface 42 of the second lens element 4 is a concave surface and has a concave portion 423 in the vicinity of the optical axis I and a concave portion 424 in the vicinity of the periphery; and the image-side surface 62 of the fourth lens element 6 has a convex portion 621 in the vicinity of the optical axis I and a concave portion 623 in the vicinity of the periphery. It should be noted that in order to clearly display the figure, a part of the referential numbers of the concave portions and the convex portions that are the same as those of the first embodiment are omitted in FIG. 22.

Detailed optical data of the fifth embodiment is shown in FIG. 24, and an EFL of the fifth embodiment is 1.991 mm, an HFOV thereof is 46.207°, an Fno thereof is 2.411, and a system length thereof is 5.159 mm.

FIG. 25 illustrates various aspheric coefficients of the object-side surface 31 of the first lens element 3 to the image-side surface 72 of the fifth lens element 7 in the equation (1) in the fifth embodiment.

Moreover, relationships between various important parameters of the imaging lens 10 of the fifth embodiment are shown in FIG. 38 and FIG. 39.

Figure 23:
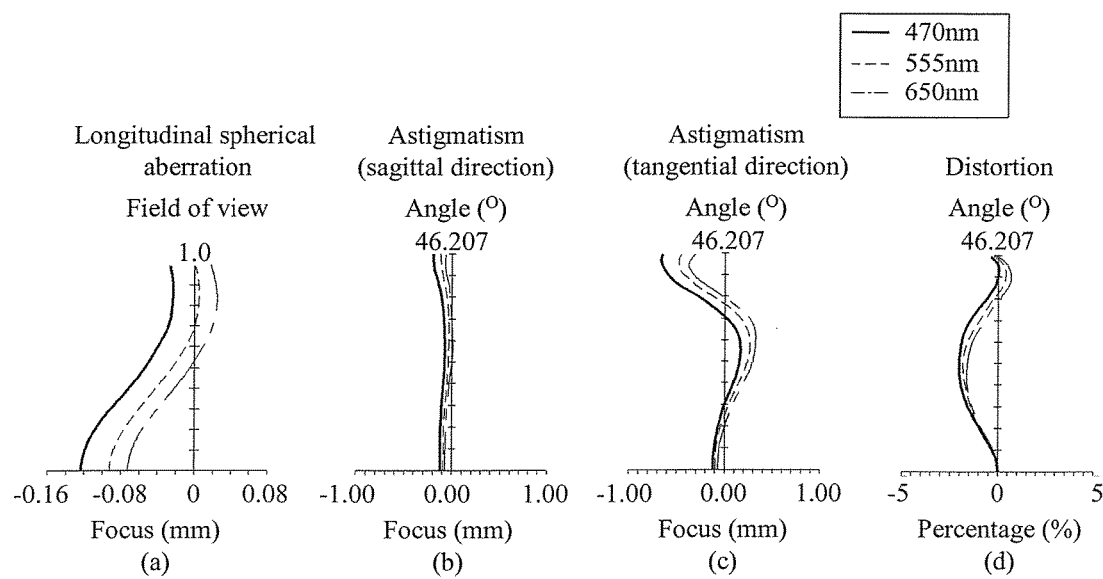
FIG. 23 is a diagram of a longitudinal spherical aberration and various aberrations of the fifth embodiment of the invention.

Referring to FIG. 23, according to the longitudinal spherical aberration of the diagram (a), the astigmatism aberrations of the diagrams (b) and (c), and the distortion aberration of the diagram (d), it is known that the fifth embodiment may also achieve the good optical performance.

According to the above description, it is learned that compared to the first embodiment, the advantages of the fifth embodiment are that the HFOV of the fifth embodiment is greater than the HFOV of the first embodiment, and the imaging quality of the fifth embodiment is superior to the imaging quality of the first embodiment.

Figure 26:
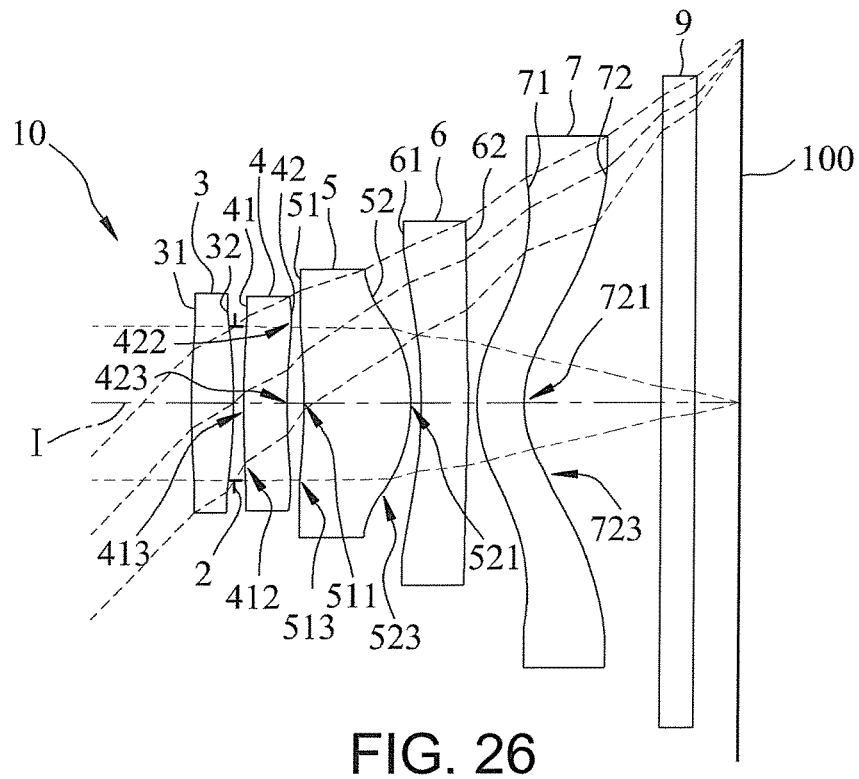
FIG. 26 is a schematic diagram of a configuration of an imaging lens according to a sixth embodiment of the invention.

Referring to FIG. 26, FIG. 26 illustrates the imaging lens 10 according to a sixth embodiment of the invention. The sixth embodiment is similar to the first embodiment, and only optical data, aspheric coefficients and parameters between the lens elements 3, 4, 5, 6 and 7 are somewhat different, and the object-side surface 41 of the second lens element 4 has a convex portion 413 in the vicinity of the optical axis I and a concave portion 412 in the vicinity of the periphery, and the image-side surface 42 of the second lens element 4 has a concave portion 423 in the vicinity of the optical axis I and a convex portion 422 in the vicinity of the periphery; the object-side surface 51 of the third lens element 5 has a concave portion 511 in the vicinity of the optical axis I and a convex portion 513 in the vicinity of the periphery, and the image-side surface 52 of the third lens element 5 has a convex portion 521 in the vicinity of the optical axis I and a concave portion 523 in the vicinity of the periphery; the image-side surface 72 of the fifth lens element 7 is a concave surface and has a concave portion 721 in the vicinity of the optical axis I and a concave portion 723 in the vicinity of the periphery. It should be noted that in order to clearly display the figure, a part of the referential numbers of the concave portions and the convex portions that are the same as those of the first embodiment are omitted in FIG. 26.

Detailed optical data of the sixth embodiment is shown in FIG. 28, and an EFL of the whole system of the sixth embodiment is 2.165 mm, an HFOV thereof is 46.950°, an Fno thereof is 2.261, and a system length thereof is 3.527 mm.

FIG. 29 illustrates various aspheric coefficients of the object-side surface 31 of the first lens element 3 to the image-side surface 72 of the fifth lens element 7 in the equation (1) in the sixth embodiment.

Moreover, relationships between various important parameters of the imaging lens 10 of the sixth embodiment are shown in FIG. 38 and FIG. 39.

Figure 27:
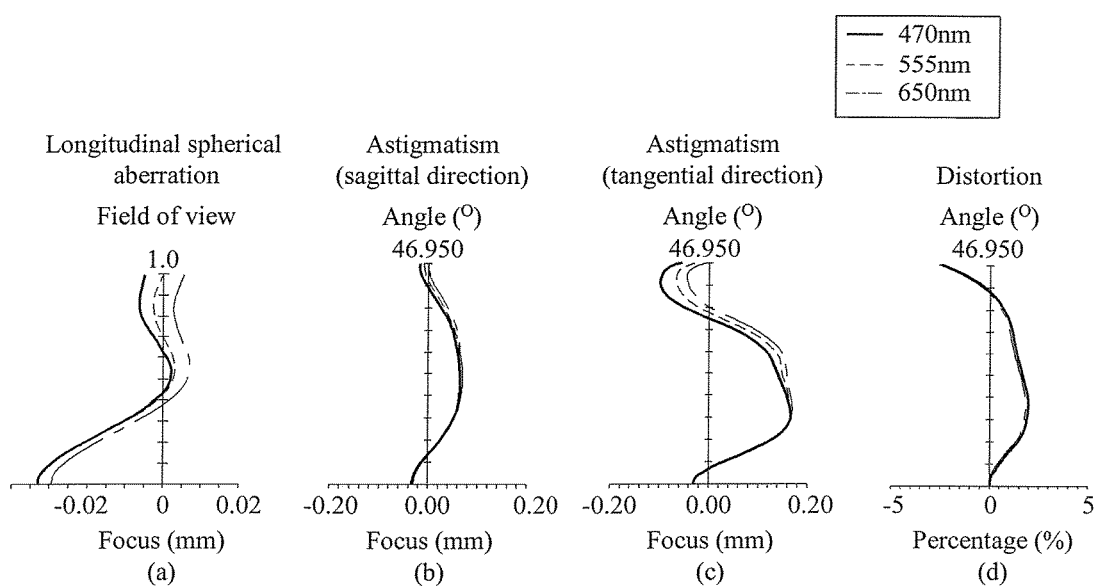
FIG. 27 is a diagram of a longitudinal spherical aberration and various aberrations of the sixth embodiment of the invention.

Referring to FIG. 27, according to the longitudinal spherical aberration of the diagram (a), the astigmatism aberrations of the diagrams (b) and (c), and the distortion aberration of the diagram (d), it is known that the sixth embodiment may also achieve the good optical performance.

According to the above description, it is learned that compared to the first embodiment, the advantages of the sixth embodiment are that the HFOV of the sixth embodiment is greater than the HFOV of the first embodiment, the Fno of the sixth embodiment is smaller than the Fno of the first embodiment, and the lens length of the sixth embodiment is smaller than the lens length of the first embodiment.

Figure 30:
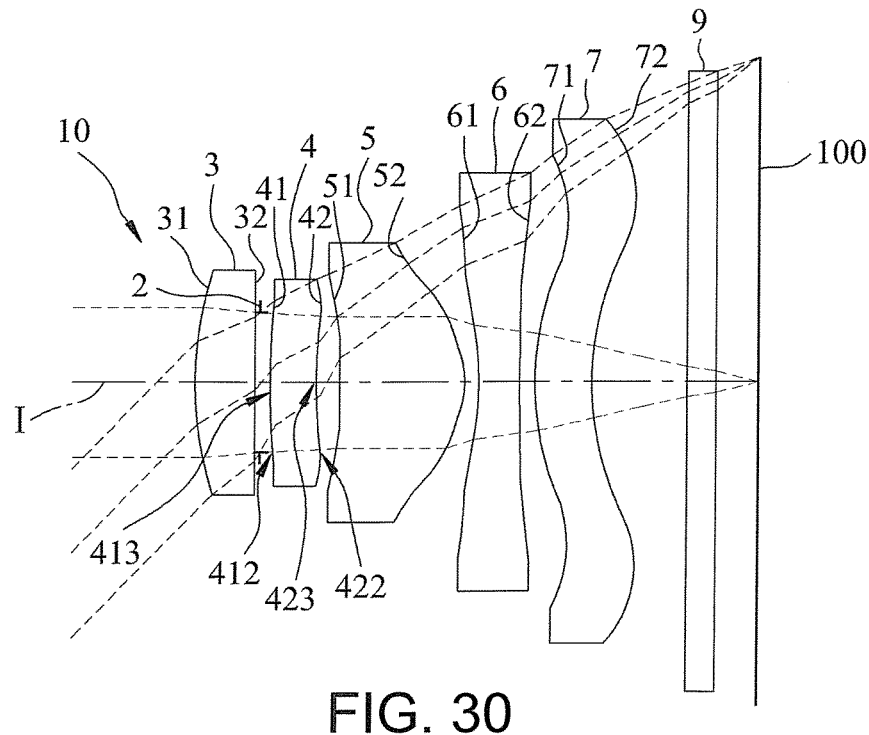
FIG. 30 is a schematic diagram of a configuration of an imaging lens according to a seventh embodiment of the invention.

Referring to FIG. 30, FIG. 30 illustrates the imaging lens 10 according to a seventh embodiment of the invention. The seventh embodiment is similar to the first embodiment, and only optical data, aspheric coefficients and parameters between the lens elements 3, 4, 5, 6 and 7 are somewhat different, and the object-side surface 41 of the second lens element 4 has a convex portion 413 in the vicinity of the optical axis I and a concave portion 412 in the vicinity of the periphery, and the image-side surface 42 of the second lens element 4 has a concave portion 423 in the vicinity of the optical axis I and a convex portion 422 in the vicinity of the periphery. It should be noted that in order to clearly display the figure, a part of the referential numbers of the concave portions and the convex portions that are the same as those of the first embodiment are omitted in FIG. 30.

Detailed optical data of the seventh embodiment is shown in FIG. 32, and an EFL of the whole system of the seventh embodiment is 2.244 mm, an HFOV thereof is 45.745°, an Fno thereof is 2.168, and a system length thereof is 3.915 mm.

FIG. 33 illustrates various aspheric coefficients of the object-side surface 31 of the first lens element 3 to the image-side surface 72 of the fifth lens element 7 in the equation (1) in the seventh embodiment.

Moreover, relationships between various important parameters of the imaging lens 10 of the seventh embodiment are shown in FIG. 38 and FIG. 39.

Figure 31:
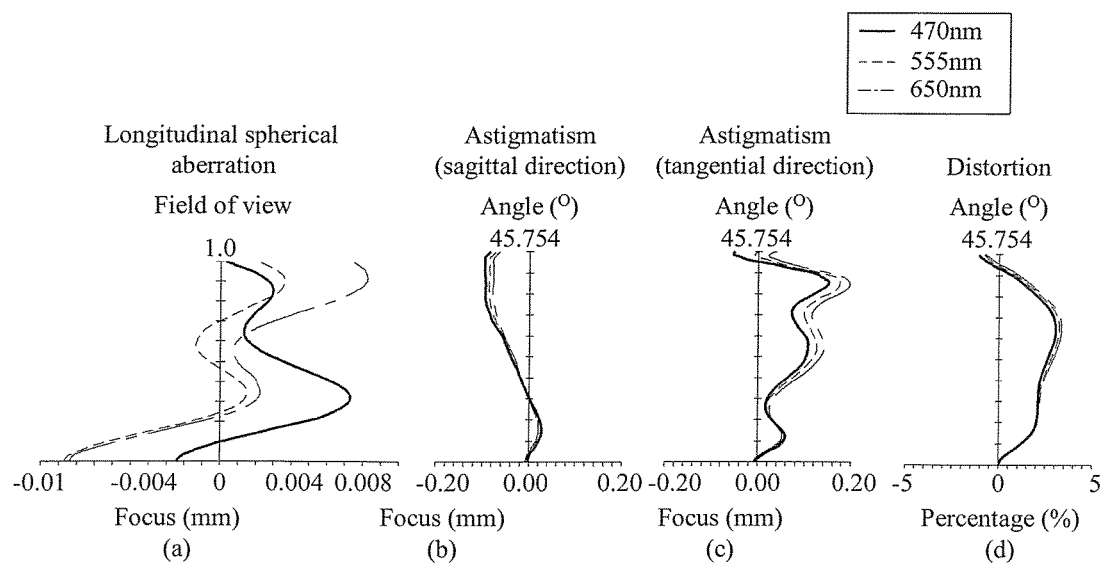
FIG. 31 is a diagram of a longitudinal spherical aberration and various aberrations of the seventh embodiment of the invention.

Referring to FIG. 31, according to the longitudinal spherical aberration of the diagram (a), the astigmatism aberrations of the diagrams (b) and (c), and the distortion aberration of the diagram (d), it is known that the seventh embodiment may also achieve the good optical performance.

According to the above description, it is learned that compared to the first embodiment, the advantages of the seventh embodiment are that the HFOV of the seventh embodiment is greater than the HFOV of the first embodiment, the Fno of the seventh embodiment is smaller than the Fno of the first embodiment, and the lens length of the seventh embodiment is smaller than the lens length of the first embodiment.

Figure 34:
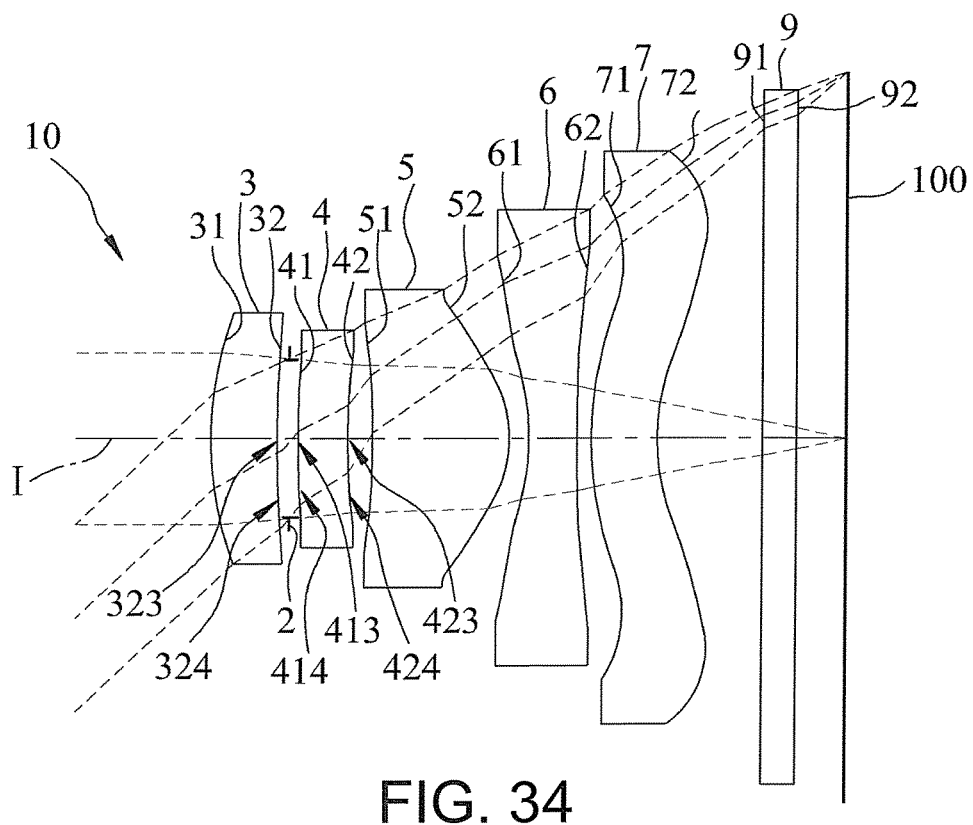
FIG. 34 is a schematic diagram of a configuration of an imaging lens according to an eighth embodiment of the invention.

Referring to FIG. 34, FIG. 34 illustrates the imaging lens 10 according to an eighth embodiment of the invention. The eighth embodiment is similar to the first embodiment, and only optical data, aspheric coefficients and parameters between the lens elements 3, 4, 5, 6 and 7 are somewhat different, and the image-side surface 32 of the first lens element 3 is a concave surface and has a concave portion 323 in the vicinity of the optical axis I and a concave portion 324 in the vicinity of the periphery; the object-side surface 41 of the second lens element 4 is a convex surface and has a convex portion 413 in the vicinity of the optical axis I and a convex portion 414 in the vicinity of the periphery, and the image-side surface 42 of the second lens element 4 is a concave surface and has a concave portion 423 in the vicinity of the optical axis I and a concave portion 424 in the vicinity of the periphery. It should be noted that in order to clearly display the figure, a part of the referential numbers of the concave portions and the convex portions that are the same as those of the first embodiment are omitted in FIG. 34.

Detailed optical data of the eighth embodiment is shown in FIG. 36, and an EFL of the whole system of the eighth embodiment is 2.376 mm, an HFOV thereof is 43.618°, an Fno thereof is 2.398, and a system length thereof is 3.903 mm.

FIG. 37 illustrates various aspheric coefficients of the object-side surface 31 of the first lens element 3 to the image-side surface 72 of the fifth lens element 7 in the equation (1) in the eighth embodiment.

Moreover, relationships between various important parameters of the imaging lens 10 of the eighth embodiment are shown in FIG. 38 and FIG. 39.

Figure 35:
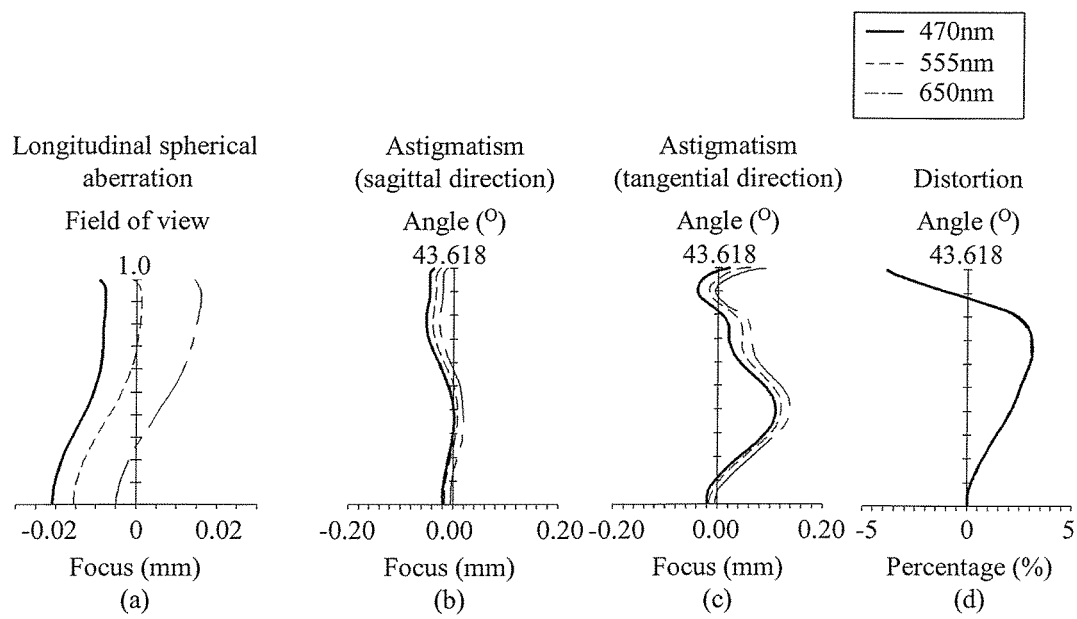
FIG. 35 is a diagram of a longitudinal spherical aberration and various aberrations of the eighth embodiment of the invention.

Referring to FIG. 35, according to the longitudinal spherical aberration of the diagram (a), the astigmatism aberrations of the diagrams (b) and (c), and the distortion aberration of the diagram (d), it is known that the eighth embodiment may also achieve the good optical performance.

According to the above description, it is learned that compared to the first embodiment, the advantages of the eighth embodiment are that the lens length of the eighth embodiment is smaller than the lens length of the first embodiment, and the imaging quality of the eighth embodiment is superior to the imaging quality of the first embodiment.

Referring to FIG. 38 and FIG. 39, FIG. 38 and FIG. 39 are table diagrams of various optical parameters of the aforementioned eight embodiments, and when the various optical parameters in the imaging lens 10 satisfy the following conditional expressions, the imaging lens 10 may still have good optical performance in case that the FOV is increased:

1. When the imaging lens satisfies (T1+T2+T4+T5)/(T3+G23)≤1.66 or (T1+T2+T4+T5)/(T3+T5)≤1.15, the thickness T3 of the third lens element 5 is controlled to be thicker than the thickness T1, T2, T4, T5 of the first lens element 3, the second lens element 4, the fourth lens element 6 and the fifth lens element 7 to provide the positive refractive power used for modifying the aberration. When exceeding an upper limit, the positive refractive power provided by the thickness T3 of the third lens element 5 is not enough. Preferably, when the imaging lens satisfies 0.55≤(T1+T2+T4+T5)/(T3+G23)≤1.66, or 0.50≤(T1+T2+T4+T5)/(T3+T5)≤1.15, the thickness T3 of the third lens element 5 is not too large to adversely affect thinning of the imaging lens 10.

2. When the imaging lens satisfies (G12+T3)/T2≤3.55, T3/T2≤2.85, or ALT/T2≤7.50, the thickness T2 of the second lens element 4 is controlled to be not too thin compared to the thickness T3 of the third lens element 5 and a thickness summation ALT of the entire lens elements, so as to provide the negative refractive power to the light converged by the first lens element 3 for being transmitted to the third lens element 5. Preferably, when 1.45≤(G12+T3)/T2≤3.55, 1.20≤T3/T2≤2.85, or 3.50≤ALT/T2≤7.50, the thickness T2 of the second lens element 4 is not too large to adversely affect thinning of the imaging lens 10.

3. Regarding conditional expressions Gaa/T5≤1.65, (T1+T2+T4+T5)/Gaa ≥2.15, (T1+T2+T4+T5)/(G12+G23+G45) ≥2.45, Gaa/T4≤2.15, ALT/Gaa≥3.50, which is preferably limited to 0.65≤Gaa/T5≤1.65, 2.15≤(T1+T2+T4+T5)/Gaa≤4.50, 2.45≤(T1+T2+T4+T5)/(G12+G23+G45)≤8.00, 1.00 Gaa/T4≤2.15, 3.50≤ALT/Gaa≤6.50, so as to maintain the thickness of each of the lens element to a suitable value to avoid too large of any of the parameters to adversely affect thinning of the imaging lens 10, or avoid too small of any of the parameters to affect assembling of the imaging lens 10 or increase manufacturing difficulty thereof.

4. When the imaging lens satisfies 14≤|υ3−υ4|≤34, chromatic aberrations on the axis or outside the axis are well corrected to achieve modification of the chromatic aberrations in collaboration with the third lens element 5 and the fourth lens element 6 used for mainly providing the refractive power.

However, due to design unpredictability of the optical system, the aforementioned schematic expressions can also be arbitrarily combined for applying to various implementations of the invention, so as to reduce the length of the imaging lens 10, to decrease the Fno, to increase the FOV, to improve the imaging quality or improve an assembling yield to mitigate the problems of the prior art.

In the practice of the invention, besides the aforementioned expressions, other detailed structures such as more convex/concave surface arrangements of the lens elements can be additionally designed for a single lens element or a plurality of lens elements to strengthen control of the system performance and/or resolution. For example, a convex portion 421 in the vicinity of the optical axis I and a concave portion 423 in the vicinity of the periphery can be additionally formed on the image-side surface 42 of the second lens element 4. It should be noted that these details can be selectively applied to the other embodiments of the invention under the premise of none confliction.

In summary, the imaging lens 10 according to the embodiments of the invention may have following effects and advantages:

1. The first lens element 3 has the positive refractive power, which avails light convergence, and in collaboration with the aperture stop 2 disposed on the image-side surface 32 of the first lens element 3, the FOV is enlarged. The third lens element 5 has the positive refractive power, the fourth lens element 6 has the negative refractive power, and the refractive powers of the third lens element 5 and the fourth lens element 6 are stronger than the refractive powers of the other lens elements, and in collaboration with the concave portion 511 in the vicinity of the optical axis I of the object-side surface 51 of the third lens element 5, and the convex portion 621 in the vicinity of the optical axis I of the image-side surface 62 of the fourth lens element 6, it avails modifying the aberrations.

2. The longitudinal spherical aberrations, the astigmatism aberrations and the distortion aberrations of each of the embodiments are all complied with a usage specification. Moreover, the off-axis lights of different heights of each of the three representative wavelengths of red, green and blue are all gathered around imaging points, and according to a deviation range of each curve, it is learned that deviations of the imaging points of the off-axis lights of different heights are controlled to achieve a good spherical aberration, astigmatism aberration and distortion aberration suppressing effect. Further referring to imaging quality data, distances between the three representative wavelengths of red, green and blue are rather close, which represents that under various states, the lights with different wavelengths may have a good concentration and a good color dispersion suppression effect is achieved. Namely, based on the designs and mutual collaboration of the lens elements, a good imaging quality of imaging lens of the invention is achieved.

3. The aforementioned eight embodiments present designs of the imaging lens 10 of the invention, and according to these embodiments, the FOV can be increased to 43.618°. Compared with the existing imaging lenses, the imaging lens 10 according to the embodiments of the invention can be used to manufacture products with a thin thickness and a larger FOV, so as to achieve an economic benefit coping with a market demand.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An imaging lens, comprising a first lens element, an aperture stop, a second lens element, a third lens element, a fourth lens element and a fifth lens element arranged in sequence from an object side to an image side along an optical axis, and each of the first lens element, the second lens element, the third lens element, the fourth lens element and the fifth lens element comprising an object-side surface facing toward the object side and pervious to an imaging light and an image-side surface facing toward the image side and pervious to the imaging light;

wherein each of the object-side surfaces and the image-side surfaces of the first lens element, the second lens element, the third lens element, the fourth lens element and the fifth lens element has a vicinity of the optical axis and a vicinity of a periphery surrounding the vicinity of the optical axis;

the first lens element having positive refractive power;

the second lens element having refractive power;

the third lens element having positive refractive power, and the object-side surface of the third lens element having a concave portion in the vicinity of the optical axis;

the fourth lens element having negative refractive power, and the image-side surface of the fourth lens element having a convex portion in the vicinity of the optical axis; and the fifth lens element having refractive power, and the object-side surface of the fifth lens element having a concave portion in the vicinity of a periphery of the fifth lens element, wherein an amount of lens elements having refractive power in the imaging lens is 5, a thickness of the first lens element on the optical axis is T1, a thickness of the second lens element on the optical axis is T2, a thickness of the third lens element on the optical axis is T3, a thickness of the fourth lens element on the optical axis is T4, a thickness of the fifth lens element on the optical axis is T5, an air gap between the second lens element and the third lens element on the optical axis is G23, and the imaging lens satisfies (T1+T2+T4+T5)/(T3+G23)≤1.65, wherein a sum of four air gaps among the first lens element to the fifth lens element on the optical axis is Gaa, a sum of thickness of the first lens element, the second lens element, the third lens element, the fourth lens element and the fifth lens element on the optical axis is ALT, and the imaging lens satisfies ALT/Gaa≥3.50.

2. The imaging lens as claimed in claim 1, wherein an air gap between the first lens element and the second lens element on the optical axis is G12, and the imaging lens satisfies (G12+T3)/T2≤3.55.

3. The imaging lens as claimed in claim 1, wherein the imaging lens satisfies T3/T2≤2.85.

4. The imaging lens as claimed in claim 1, wherein the imaging lens further satisfies ALT/T2≤7.5.

5. The imaging lens as claimed in claim 1, wherein the imaging lens further satisfies Gaa/T5≤1.65.

6. The imaging lens as claimed in claim 1, wherein the imaging lens further satisfies (T1+T2+T4+T5)/Gaa≥2.15.

7. The imaging lens as claimed in claim 1, wherein an air gap between the first lens element and the second lens element on the optical axis is G12, and an air gap between the fourth lens element and the fifth lens element on the optical axis is G45, and the imaging lens satisfies (T1+T2+T4+T5)/(G12+G23+G45)≥2.45.

8. The imaging lens as claimed in claim 1, wherein the imaging lens further satisfies Gaa/T4≤2.15.

9. The imaging lens as claimed in claim 1, wherein a dispersion coefficient of the third lens element is υ3, a dispersion coefficient of the fourth lens element is υ4, and the imaging lens satisfies 14≤|υ3−υ4|≤34.

10. An imaging lens, comprising a first lens element, an aperture stop, a second lens element, a third lens element, a fourth lens element and a fifth lens element arranged in sequence from an object side to an image side along an optical axis, and each of the first lens element, the second lens element, the third lens element, the fourth lens element and the fifth lens element comprising an object-side surface facing toward the object side and pervious to an imaging light and an image-side surface facing toward the image side and pervious to the imaging light;
wherein each of the object-side surfaces and the image-side surfaces of the first lens element, the second lens element, the third lens element, the fourth lens element and the fifth lens element has a vicinity of the optical axis and a vicinity of a periphery surrounding the vicinity of the optical axis;
the first lens element having positive refractive power;
the second lens element having refractive power;
the third lens element having positive refractive power, and the object-side surface of the third lens element having a concave portion in the vicinity of the optical axis;
the fourth lens element having negative refractive power, and the image-side surface of the fourth lens element having a convex portion in the vicinity of the optical axis; and
the fifth lens element having refractive power,
wherein an amount of lens elements having refractive power in the imaging lens is 5, a thickness of the first lens element on the optical axis is T1, a thickness of the second lens element on the optical axis is T2, a thickness of the third lens element on the optical axis is T3, a thickness of the fourth lens element on the optical axis is T4, a thickness of the fifth lens element on the optical axis is T5, and the imaging lens satisfies (T1+T2+T4+T5)/(T3+T5)≤1.15,
wherein a sum of four air gaps among the first lens element to the fifth lens element on the optical axis is Gaa, a sum of thickness of the first lens element, the second lens element, the third lens element, the fourth lens element and the fifth lens element on the optical axis is ALT, and the imaging lens satisfies ALT/Gaa≥3.50.

11. The imaging lens as claimed in claim 10, wherein an air gap between the first lens element and the second lens element on the optical axis is G12, and the imaging lens satisfies (G12+T3)/T2≤3.55.

12. The imaging lens as claimed in claim 10, wherein the imaging lens satisfies T3/T2 ≤2.85.

13. The imaging lens as claimed in claim 10, wherein the imaging lens further satisfies ALT/T2≤7.5.

14. The imaging lens as claimed in claim 10, wherein the imaging lens further satisfies Gaa/T5≤1.65.

15. The imaging lens as claimed in claim 10, wherein the imaging lens further satisfies (T1+T2+T4+T5)/Gaa≥2.15.

16. The imaging lens as claimed in claim 10, wherein an air gap between the first lens element and the second lens element on the optical axis is G12, an air gap between the second lens element and the third lens element on the optical axis is G23, an air gap between the fourth lens element and the fifth lens element on the optical axis is G45, and the imaging lens satisfies (T1+T2+T4+T5)/(G12+G23+G45) ≥2.45.

17. The imaging lens as claimed in claim 10, wherein the imaging lens further satisfies Gaa/T4≤2.15.

18. The imaging lens as claimed in claim 10, wherein a dispersion coefficient of the third lens element is υ3, a dispersion coefficient of the fourth lens element is υ4, and the imaging lens satisfies 14≤|υ3−υ4|≤34.

* * * * *